(12) United States Patent
Ashiba

(10) Patent No.: US 9,121,524 B2
(45) Date of Patent: Sep. 1, 2015

(54) SHOCK ABSORBER

(71) Applicant: HITACHI AUTOMOTIVE SYSTEMS, LTD., Ibaraki (JP)

(72) Inventor: Masahiro Ashiba, Kawasaki (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 86 days.

(21) Appl. No.: 14/092,493

(22) Filed: Nov. 27, 2013

(65) Prior Publication Data

US 2014/0150897 A1 Jun. 5, 2014

(30) Foreign Application Priority Data

Nov. 30, 2012 (JP) .................. 2012-262812
Feb. 28, 2013 (JP) .................. 2013-039312

(51) Int. Cl.
*F16K 47/00* (2006.01)
*F16F 9/348* (2006.01)

(52) U.S. Cl.
CPC ............... *F16K 47/00* (2013.01); *F16F 9/3485* (2013.01); *Y10T 137/6851* (2015.04)

(58) Field of Classification Search
CPC ........... F16K 47/00; B60G 17/08; F16F 9/34; F16F 9/36; F16F 9/325; F16F 9/344; F16F 9/512; F16F 9/516; F16F 9/3481; F16F 9/3482; F16F 9/3484; F16F 9/3485; F16F 9/5126

USPC ....................... 188/322.13, 322.15
See application file for complete search history.

(56) References Cited

U.S. PATENT DOCUMENTS

| 4,905,799 | A | 3/1990 | Yamaoka et al. | |
|---|---|---|---|---|
| 6,220,409 | B1* | 4/2001 | Deferme | 188/322.15 |
| 2009/0260938 | A1* | 10/2009 | Hikosaka | 188/322.15 |
| 2011/0214953 | A1* | 9/2011 | Maeda et al. | 188/266 |
| 2013/0048451 | A1* | 2/2013 | Yamashita | 188/280 |

FOREIGN PATENT DOCUMENTS

JP 02-066333 3/1990
JP 2011-179550 9/2011

* cited by examiner

*Primary Examiner* — Anna Momper
*Assistant Examiner* — San Aung
(74) *Attorney, Agent, or Firm* — Nixon & Vanderhye P.C.

(57) ABSTRACT

Provided is a shock absorber that includes a disk support section protruding between an intermediate seat and an inner seat, having a tip height position in a protruding direction higher than that of the inner seat and lower than that of the intermediate seat, and continuously or discontinuously disposed in an annular shape. In a state in which a first disk is pressed against the inner seat and placed on an outer seat, the intermediate seat and the disk support section, in the first disk, a first bending section bent in a convex shape toward a valve main body side is formed between the inner seat and the disk support section, and a second bending section bent in a convex shape toward a side spaced apart from the valve main body is formed between the disk support section and the outer seat.

11 Claims, 14 Drawing Sheets

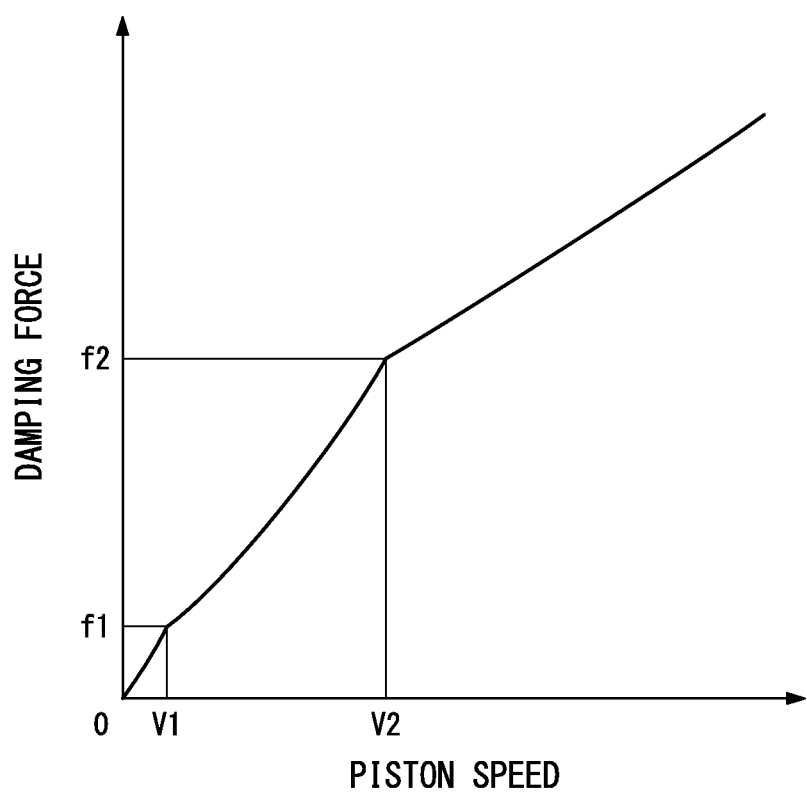

SHOCK ABSORBER

BACKGROUND OF THE INVENTION

1. Field of the Invention

The present invention relates to a shock absorber.

Priority is claimed on Japanese Patent Application Nos. 2012-262812, filed Nov. 30, 2012, and 2013-039312, filed Feb. 28, 2013, the contents of which are incorporated herein by reference.

2. Description of Related Art

In a shock absorber, a configuration in which, among an outer seat, an intermediate seat and an inner seat, the height of the intermediate seat is decreased and a disk is pressed against the intermediate seat by a spring to apply a set load to the disk is disclosed (for example, see Japanese Unexamined Patent Application, First Publication No. H02-66333).

In addition, in the shock absorber, a configuration in which an outer seat, an intermediate seat and an inner seat are provided, and a disk support section is provided to connect the intermediate seat and the inner seat in a radial direction, is disclosed (for example, see Japanese Unexamined Patent Application, First Publication No. 2011-179550).

In the structure, since a set load is increased and a valve opening point is increased, it cannot be said that valve properties are appropriate.

SUMMARY OF THE INVENTION

The present invention provides a shock absorber capable of optimizing valve properties.

According to a first aspect of the present invention, a shock absorber includes a cylinder in which a working fluid is sealed, a piston slidably inserted into the cylinder and configured to partition the inside of the cylinder into two chambers, a piston rod connected to the piston and extending to the outside of the cylinder, a plurality of paths through which the working fluid flows due to sliding movement of the piston, and a damping force generating mechanism installed at a portion of the path and configured to suppress a flow of the working fluid to generate a damping force. The damping force generating mechanism includes a valve main body through which the path passes, an annular outer seat protruding to the valve main body, an inner seat protruding into the outer seat of the valve main body, an annular intermediate seat protruding to surround an opening section of the path between the outer seat and the inner seat of the valve main body, a disk support section protruding between the intermediate seat and the inner seat, having a tip height position in a protruding direction higher than that of the inner seat and lower than that of the intermediate seat, and continuously or discontinuously disposed in an annular shape, and a first disk placed to be capable of sitting on the outer seat, the inner seat, the intermediate seat and the disk support section. In a state in which the first disk is pressed against the inner seat and placed on the outer seat, the intermediate seat and the disk support section, in the first disk, a first bending section bent in a convex shape toward the valve main body side is formed between the inner seat and the disk support section, and a second bending section bent in a convex shape toward a side spaced apart from the valve main body is formed between the disk support section and the outer seat. Accordingly, the shock absorber sits on the intermediate seat and the outer seat.

The plurality of disk support sections may be disposed between the paths neighboring in the circumferential direction of the valve main body.

A second disk having a diameter smaller than that of the first disk may be placed on the first disk.

A third bending section approaching the valve main body may be formed at the first disk outside the second bending section between the intermediate seat and the outer seat.

According to a second aspect of the present invention, a shock absorber includes a cylinder in which a working fluid is sealed, a piston slidably inserted into the cylinder and configured to partition the inside of the cylinder into two chambers, a piston rod connected to the piston and extending to the outside of the cylinder, a plurality of paths through which the working fluid flows due to sliding movement of the piston, and a damping force generating mechanism installed at a portion of the path and configured to suppress a flow of the working fluid to generate a damping force. The damping force generating mechanism includes a valve main body through which the path passes, an annular outer seat protruding to the valve main body, an inner seat protruding into the outer seat of the valve main body, an annular intermediate seat protruding to surround an opening section of the path between the outer seat and the inner seat of the valve main body, a disk support section protruding between the intermediate seat and the inner seat and continuously or discontinuously disposed in an annular shape, and a first disk placed on the outer seat, the inner seat, the intermediate seat and the disk support section. The disk support section has a tip height position in the protruding direction higher than that of the first disk in the same position in the radial direction that is pressed against the inner seat and placed on the intermediate seat. The outer seat has a tip height position in the protruding direction higher than that of the first disk in the same position in the radial direction that is pressed against the inner seat and placed on the intermediate seat and the disk support section.

According to a third aspect of the present invention, a shock absorber includes a cylinder in which a working fluid is sealed, a piston slidably inserted into the cylinder and configured to partition the inside of the cylinder into two chambers, a piston rod connected to the piston and extending to the outside of the cylinder, a plurality of paths through which the working fluid flows due to sliding movement of the piston, and a damping force generating mechanism installed at a portion of the path and configured to suppress the flow of the working fluid to generate a damping force. The damping force generating mechanism includes a valve main body through which the path passes, an outer protrusion section protruding to the valve main body, an inner seat protruding into the outer protrusion section of the valve main body, an intermediate protrusion section configured to protrude between the outer protrusion section and the inner seat of the valve main body, a disk support section protruding between the intermediate protrusion section and the inner seat, having a tip height position in the protruding direction higher than that of the inner seat and lower than that of the intermediate protrusion section, and continuously or discontinuously disposed in an annular shape, and a disk placed to be capable of sitting on the outer protrusion section, the inner seat, the intermediate protrusion section and the disk support section. In a state in which the disk is pressed against the inner seat and placed on the outer protrusion section, the intermediate protrusion section and the disk support section, in the disk, a first bending section bent in a convex shape toward the valve main body side is formed between the inner seat and the disk support section, and a second bending section bent in a convex shape toward a side separated from the valve main body is formed between the disk support section and the outer protrusion section. Accordingly, the shock absorber sits on the intermediate protrusion section and the outer protrusion section.

The outer protrusion section may be formed in an annular shape, and the intermediate protrusion section may be formed in an annular shape to surround an opening section of the path.

According to the above-mentioned shock absorber, valve properties can be optimized.

BRIEF DESCRIPTION OF THE DRAWINGS

FIG. 5 is a characteristic diagram showing damping force properties of the shock absorber according to the first embodiment of the present invention.

DETAILED DESCRIPTION OF THE INVENTION

First Embodiment

A shock absorber according to a first embodiment of the present invention will be described below with reference to FIGS. 1 to 5.

Figure 1:
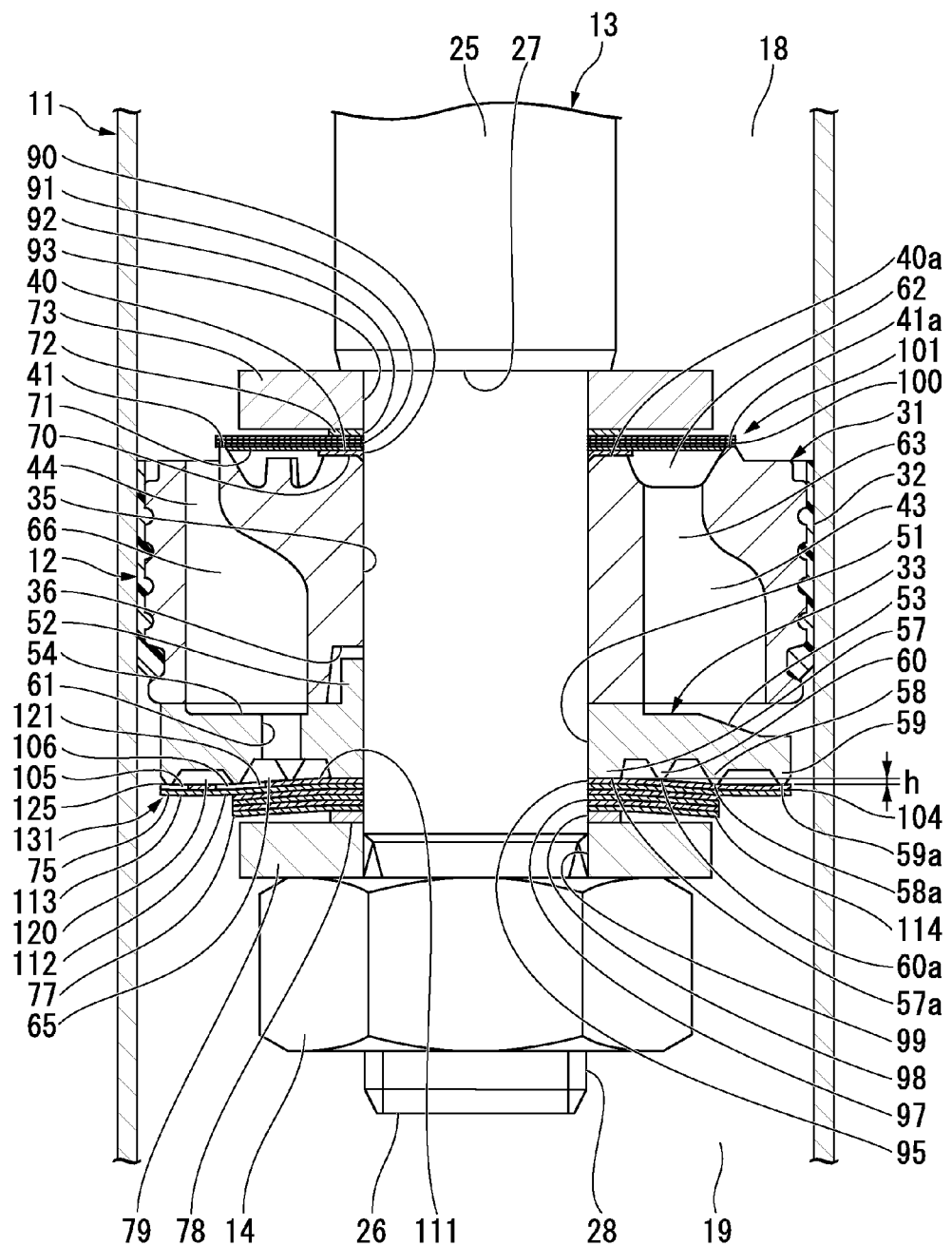
FIG. 1 is a partial cross-sectional view of a shock absorber according to a first embodiment of the present invention.

As shown in FIG. 1, the shock absorber of the first embodiment has a cylinder 11 in which a working fluid such as a liquid, a gas, or the like, is sealed. The cylinder 11 has a bottomed cylindrical shape with one end side (an upper side of FIG. 1) open and the other end side (a lower side of FIG. 1) closed, illustrations of which are omitted. A piston 12 is slidably fitted into the cylinder 11.

The other end side of a piston rod 13 having one end side (an upper side of FIG. 1) extending toward the outside of the cylinder 11 is inserted into the cylinder 11. The piston 12 is connected to the other end section of the piston rod 13 by a nut 14. In addition, while not shown, one end side of the piston rod 13 is inserted into a rod guide and an oil seal mounted on one end opening section of the cylinder 11 to extend to the outside. The piston 12 partitions the inside of the cylinder 11 into two chambers, i.e., a rod chamber 18 at a side to which the piston rod 13 extends (an upper side of FIG. 1) and a bottom chamber 19 at a bottom section side (not shown, a lower side of FIG. 1) of the cylinder 11.

The piston rod 13 has a main shaft section 25 and an attachment shaft section 26 disposed at an inner end section of the cylinder 11 and having a smaller diameter than that of the main shaft section 25. Accordingly, a stepped section 27 is formed at an end of the main shaft section 25 near the attachment shaft section 26 in a direction perpendicular to an axis thereof. A male screw 28 threadedly engaged with the above-mentioned nut 14 is formed at a predetermined range of the attachment shaft section 26 opposite to the main shaft section 25.

The piston 12 has a piston main body (a valve main body) 31 having substantially a circular plate shape, an annular sliding contact member 32 mounted on an outer circumferential surface of the piston main body 31 and in slidable contact with the inside of the cylinder 11, and a retainer (a valve main body) 33 disposed at the piston main body 31 near the bottom chamber 19. In addition, each of the piston main body 31 and a retainer 33 is formed by sintering.

In the piston main body 31, an insertion hole 35 through which the piston rod 13 is inserted is formed to pass therethrough in the axial direction at a center in the radial direction. A positioning concave section 36 concaved in the axial direction and the radial direction is formed partially in a circumferential direction in an opening section of the insertion hole 35 near the bottom chamber 19.

In addition, an annular inner seat 40 protruding in the axial direction outside the insertion hole 35 in the radial direction and an annular outer seat 41 protruding in the axial direction further outside than the inner seat 40 in the radial direction are formed at an end of the piston main body 31 near the rod chamber 18.

A plurality of path holes 43 opened between the inner seat 40 and the outer seat 41 and passing in the axial direction are formed in the piston main body 31 near the rod chamber 18 in the circumferential direction at intervals (only one is shown in FIG. 1 due to illustration as a cross-sectional view). In addition, a plurality of path holes 44 opened further outside than the outer seat 41 and passing in the axial direction are formed in the piston main body 31 near the rod chamber 18 in the circumferential direction at intervals (only one is shown in FIG. 1 due to illustration as a cross-sectional view). The path holes 43 and the path holes 44 are alternately disposed in the circumferential direction of the piston main body 31.

An insertion hole 51 through which the piston rod 13 is inserted is formed in a center in the radial direction of the retainer 33 to pass therethrough in the axial direction. A positioning convex section 52 protruding in the axial direction is formed partially in the circumferential direction outside of the opening section of the insertion hole 51 near the piston main body 31. In addition, a plurality of path notch sections 53 concaved in the axial direction to be cutout from between the insertion hole 51 and the outer circumferential section toward the outer circumferential section are formed in the retainer 33 near the piston main body 31 in the circumferential direction at intervals (only one is shown in FIG. 1 due to illustration as a cross-sectional view). In addition, a plurality of path concave sections 54 concaved between the insertion hole 51 and the outer circumferential section in the axial direction are formed in the retainer 33 near the piston main body 31 in the circumferential direction at intervals (only one is shown in FIG. 1 due to illustration as a cross-sectional view). The path notch sections 53 and the path concave sections 54 are alternately disposed in the circumferential direction of the piston main body 31.

An inner seat 57, an intermediate seat (an intermediate protrusion section) 58 and an outer seat (an outer protrusion section) 59 are formed at the retainer 33 opposite to the piston main body 31. The inner seat 57 protrudes in the axial direction of the retainer 33 outside the insertion hole 51 in the radial direction. The intermediate seat 58 protrudes in the axial direction of the retainer 33 further outside than the inner seat 57 in the radial direction. The outer seat 59 protrudes in the axial direction of the retainer 33 further outside than the intermediate seat 58 in the radial direction. In addition, a disk support section 60 protruding from between the intermediate seat 58 and the inner seat 57 in the axial direction of the retainer 33 is formed at the retainer 33 opposite to the piston main body 31. That is, the intermediate seat 58 and the outer seat 59 are configured by continuously disposing the protrusion sections in an annular shape.

A path hole 61 having one end opened toward the path concave section 54 and the other end opened between the inner seat 57 and the intermediate seat 58 and passing therethrough in the axial direction are formed in the retainer 33 at a position of a bottom surface of all of the path concave section 54.

In the retainer 33, when positions in the radial direction are matched with respect to the piston main body 31 and the positioning convex section 52 is fitted into the positioning concave section 36, the path notch section 53 coordinates the position in the circumferential direction with the path hole 43 and the path concave section 54 coordinates the position in the circumferential direction with the path hole 44. Accordingly, the path notch section 53 is in communication with the path hole 43, and the path concave section 54 is in communication with the path hole 44. The path notch section 53 and the path hole 43 configure the path 63 together with a chamber 62 between the inner seat 40 and the outer seat 41, wherein the path 63 is able to come in communication with the rod chamber 18 and the bottom chamber 19 and are always in communication with the bottom chamber 19. The path hole 44, the path concave section 54 and the path hole 61 configure a path 66 together with a chamber 65 between the inner seat 57 and the intermediate seat 58, wherein the path 66 is able to come in communication with the rod chamber 18 and the bottom chamber 19 and are always in communication with the rod chamber 18.

Figure 2:
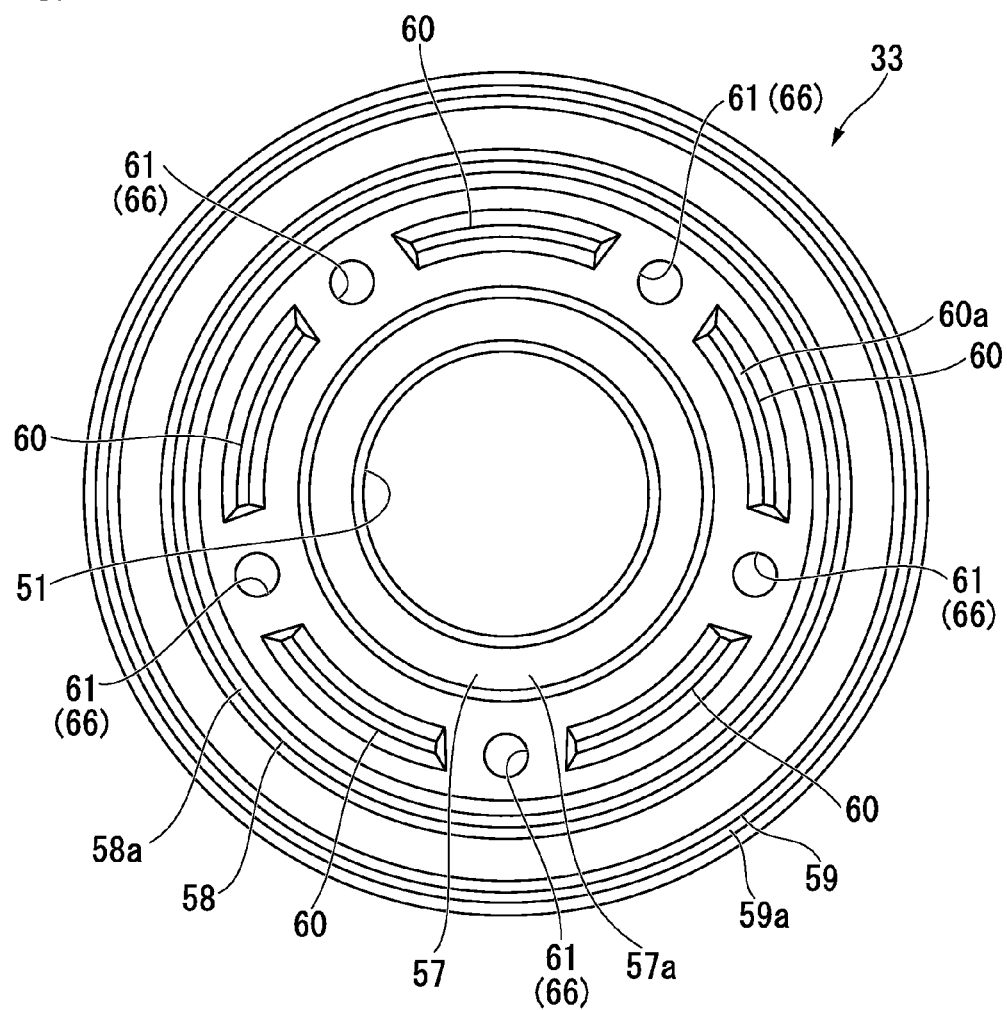
FIG. 2 is a plan view showing a retainer used in the shock absorber according to the first embodiment of the present invention.

As shown in FIG. 2, the inner seat 57 has an annular shape to surround the insertion hole 51. Specifically, the inner seat 57 has an annular shape concentric with the insertion hole 51. The intermediate seat 58 has an annular shape to surround the inner seat 57. Specifically, the intermediate seat 58 has an annular shape concentric with a center of the inner seat 57. The outer seat 59 has an annular shape to surround the intermediate seat 58. Specifically, the outer seat 59 has an annular shape concentric with a center of the intermediate seat 58.

The plurality of (specifically, five) disk support sections 60 are installed to be disposed at equal intervals such that the path holes 61 of the path 66 are disposed between the neighboring disk support sections 60 in the circumferential direction of the retainer 33. In other words, the plurality of (specifically, five) path holes 61 of the path 66 are disposed at equal intervals such that the disk support sections 60 are disposed between the neighboring path holes 61 in the circumferential direction of the retainer 33. The disk support sections 60 have an arc shape and are disposed at annular positions to surround the inner seat 57. Specifically, the disk support sections 60 are disposed at annular positions concentric with the center of the inner seat 57. Accordingly, the plurality of disk support sections 60 are discontinuously disposed in an annular shape between the intermediate seat 58 and the inner seat 57.

As shown in FIG. 1, a spacer 70, a disk 71, a spacer 72 and a restriction member 73 are provided at the piston main body 31 of the piston 12 near the rod chamber 18 in the axial direction in a sequence from the piston main body 31 side in the axial direction. In addition, a first disk 75, a second disk 77, a spacer 78 and a restriction member 79 are provided at the retainer 33 opposite to the piston main body 31 in the axial direction in a sequence from the retainer 33 side.

An insertion hole 90 is formed at a center in the radial direction of the spacer 70, an insertion hole 91 is formed at a center in the radial direction of the disk 71, an insertion hole 92 is formed at a center in the radial direction of the spacer 72, and an insertion hole 93 is formed at a center in the radial direction of the restriction member 73 to pass therethrough in the axial direction. In addition, an insertion hole 95 is formed at a center in the radial direction of the first disk 75, an insertion hole 97 is formed at a center in the radial direction of the second disk 77, an insertion hole 98 is formed at a center in the radial direction of the spacer 78, and an insertion hole 99 is formed at a center in the radial direction of the restriction member 79 to pass therethrough in the axial direction.

Then, the attachment shaft section 26 of the piston rod 13 is sequentially inserted into the insertion hole 93 of the restriction member 73, the insertion hole 92 of the spacer 72, the insertion hole 91 of the disk 71, the insertion hole 90 of the spacer 70, the insertion hole 35 of the piston main body 31, the insertion hole 51 of the retainer 33, the insertion hole 95 of the first disk 75, the insertion hole 97 of the second disk 77, the insertion hole 98 of the spacer 78, and the insertion hole 99 of the restriction member 79, and in this state, the nut 14 is threadedly engaged with the male screw 28 of the attachment shaft section 26.

Then, all of the restriction member 73, the spacer 72, the disk 71, the spacer 70, the piston main body 31, the retainer 33, the first disk 75, the second disk 77, the spacer 78 and the restriction member 79 are stacked with restriction of movement in the radial direction at the attachment shaft section 26, and in the stacked state, sandwiched by the stepped section 27 of the piston rod 13 and the nut 14. Here, only the inner circumferential sides of the disk 71, the first disk 75 and the second disk 77 are clamped not to move with respect to the piston rod 13 in the axial direction.

The spacer 70 has an outer diameter slightly larger than that of the seat surface 40a of the inner seat 40. The disk 71 is configured by stacking a plurality of (specifically four) single body disks 100 having the same diameter and circular plate shape, and has an outer diameter slightly larger than that of a seat surface 41a of the outer seat 41. In a natural state before assembly to the piston rod 13, each of front and rear surfaces of the single body disk 100 has a flat shape disposed at a certain position in the axial direction, i.e., a flat plate shape. Accordingly, the disk 71 also has a flat shape, i.e., a flat plate shape.

The spacer 72 has an outer diameter slightly smaller than that of a seat surface 40a of the inner seat 40. The restriction member 73 has an outer diameter slightly smaller than an inner diameter of the seat surface 41a of the outer seat 41.

In tip height positions in a protruding direction of the inner seat 40 and the outer seat 41 formed at the piston main body 31 near the rod chamber 18, provided that the protruding direction is a forward direction, the tip height position in the protruding direction of the outer seat 41 is slightly higher than that in the protruding direction of the inner seat 40. That is, a height position in the protruding direction of the seat surface 41a of a tip in the protruding direction of the outer seat 41 is higher than that in the protruding direction of the seat surface 40a of a tip in the protruding direction of the inner seat 40. More specifically, the height position in the protruding direction of the seat surface 41a of the outer seat 41 is higher than that of the spacer 70 abutting the seat surface 40a in the protruding direction of the inner seat 40.

The disk 71 is assembled to the piston rod 13 to be pressed against the spacer 70 abutting the seat surface 40a of the inner seat 40, and in a non-operating state in which there is no pressure difference between the rod chamber 18 and the bottom chamber 19, seated on the seat surface 41a of the outer seat 41 of the piston main body 31 to close a path 63 formed at the piston main body 31 and the retainer 33. Then, when a piston rod 13 is moved to a compression side at which an advance amount to the cylinder 11 is increased, if the pressure in the bottom chamber 19 is increased to be larger than that of the rod chamber 18 by the piston 12 moved with the piston rod 13, the disk 71 is separated from the outer seat 41 to open the path 63. Accordingly, a working fluid flows at a flow rate corresponding to a valve opening amount between the disk 71 and the outer seat 41 from the bottom chamber 19 to the rod chamber 18 via the path 63. That is, when the piston rod 13 is moved to the compression side and thus the piston 12 is slid in the cylinder 11, the working fluid flows by the sliding movement from the bottom chamber 19 toward the rod chamber 18.

The piston main body 31 and the retainer 33 through which the path 63 passes, the annular outer seat 41 protruding to the piston main body 31 to surround the opening section of the path 63, the inner seat 40 configured to integrally hold the disk 71 of the piston main body 31, and the disk 71 configured to open and close the path 63 near the rod chamber 18 configure a damping force generating mechanism 101 of the compression side installed at a portion of the path 63 and configured to suppress a flow of the working fluid to generate a damping force.

Figure 3:
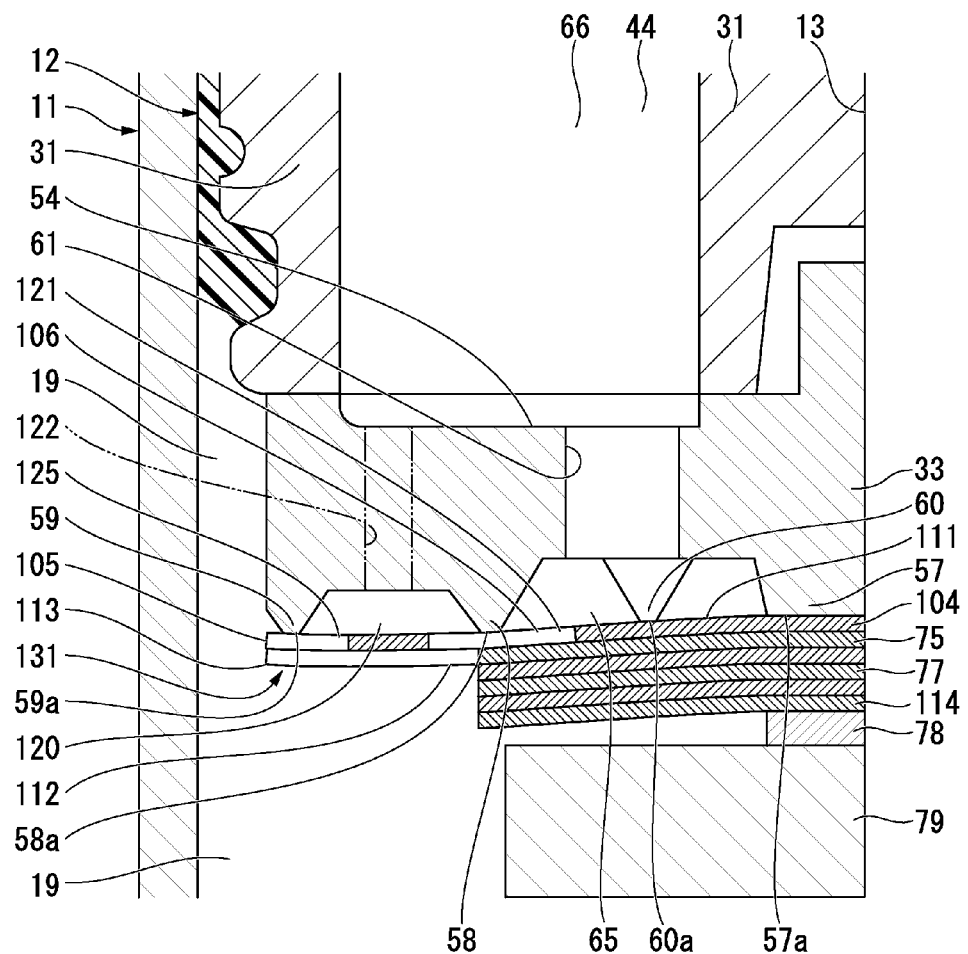
FIG. 3 is a partially enlarged cross-sectional view of major parts of the shock absorber according to the first embodiment of the present invention.

As shown in FIG. 3, the first disk 75 is configured by stacking a plurality of (specifically two) single body disks 104 having the same diameter and the same circular plate shape, and has an outer diameter larger than that of a seat surface 59a on which the outer seat 59 sits. In a natural state before assembly to the piston rod 13, front and rear surfaces of the single body disk 104 have a flat shape disposed at a certain position in the axial direction, i.e., a flat plate shape. Accordingly, the first disk 75 also has the same flat shape, i.e., a flat plate shape. A disk notch section 105 having a shape passing through in the axial direction and cutout at the outer circumferential edge section is formed at an outer circumferential section of the single body disk 104 of the first disk 75 closest to the retainer 33. In addition, a disk path hole 106 inside more than the outer circumferential edge section of the outer circumferential section is formed in the single body disk 104 closest to the retainer 33.

The second disk 77 is configured by stacking a plurality of (specifically four) single body disks 114 having the same diameter and the same circular plate shape, and has an outer diameter smaller than that of the first disk 75, smaller than an inner diameter of the seat surface 59a of the outer seat 59 on which the first disk 75 sits, and larger than that of a seat surface 58a of the intermediate seat 58 on which the first disk 75 sits. In a natural state before assembly to the piston rod 13, front and rear surfaces of the single body disk 114 have a flat shape disposed at a certain position in the axial direction, i.e., a flat plate shape. Accordingly, the second disk 77 also has the same flat shape, i.e., the flat plate shape.

The spacer 78 has an annular shape having an outer diameter substantially equal to that of a seat surface 57a of the inner seat 57. The restriction member 79 has an annular shape having an outer diameter substantially equal to an inner diameter of the seat surface 58a of the intermediate seat 58.

In tip height positions in the protruding direction of the inner seat 57, the intermediate seat 58, the outer seat 59 and the disk support section 60, provided that the protruding direction (a downward direction of FIG. 3) is a forward direction, the tip height position in the protruding direction of the intermediate seat 58 is higher than that in the protruding direction of the inner seat 57, and the tip height position in the protruding direction of the outer seat 59 is equal to or higher than that in the protruding direction of the intermediate seat 58. In addition, the tip height position in the protruding direction of the disk support section 60 is higher than that in the protruding direction of the inner seat 57, and lower than that in the protruding direction of the intermediate seat 58.

In other words, the height position of the seat surface 58a of the tip in the protruding direction of the intermediate seat 58 is higher than that in the protruding direction of the seat surface 57a of the tip in the protruding direction of the inner seat 57, and the height position in the protruding direction of the seat surface 59a of the tip in the protruding direction of the outer seat 59 is equal to or higher than that in the protruding direction of seat surface 58a of the tip in the protruding direction of the intermediate seat 58. In addition, the height position in the protruding direction of the seat surface 60a of the tip in the protruding direction of the disk support section 60 is higher than that in the protruding direction of the seat surface 57a of the tip in the protruding direction of the inner seat 57, and the height position in the protruding direction of the seat surface 58a of the tip in the protruding direction of the intermediate seat 58 is higher than that in the protruding direction of the seat surface 60a of the tip in the protruding direction of the disk support section 60.

Here, the tip height positions in the protruding direction of the inner seat 57, the intermediate seat 58, the outer seat 59 and the disk support section 60 are set such that the first disk 75 having the flat plate shape placed at the position is elastically deformed into the following forms.

Figure 4A:
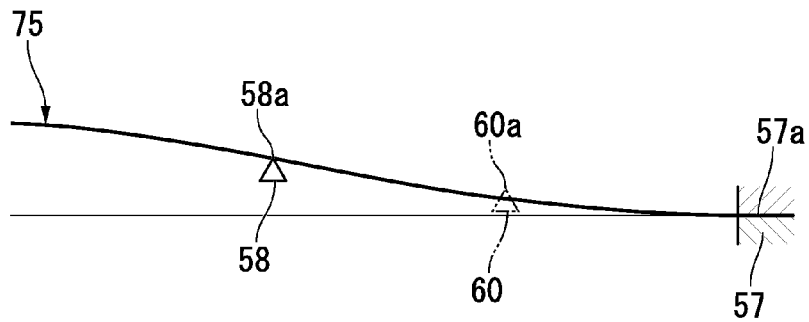
FIG. 4A is a schematic view which shows a setting method of a height of each seat and disk support section of the shock absorber according to the first embodiment of the present invention.
Figure 4B:
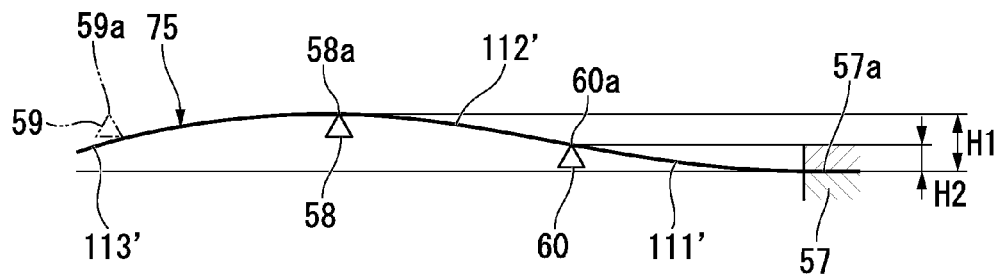
FIG. 4B is a schematic view which shows the setting method of the height of each seat and disk support section of the shock absorber according to the first embodiment of the present invention.

First, a schematic view for explaining a setting method of the height of each seat is shown in FIGS. 4A and 4B. As schematically shown in FIG. 4A, the disk support section 60 is set such that the tip height position in the protruding direction is higher than the first disk 75 in the same position in the radial direction while being pressed against the inner seat 57 and placed on the intermediate seat 58. That is, when only the inner seat 57 and the intermediate seat 58 are installed and press the first disk 75 against the seat surface 57a of the inner seat 57 to be placed on the seat surface 58a of the intermediate seat 58, a height position of the first disk 75 at a position in the radial direction at which the disk support section 60 is disposed in this state is obtained. Then, the position of the disk support section 60 is set such that the seat surface 60a is disposed at a position higher than the height position. When only the inner seat 57 and the intermediate seat 58 having the tip height position in the protruding direction higher than that of the inner seat 57 are installed, the first disk 75 is bent to form a convex shape in a direction opposite to the protruding direction of the intermediate seat 58 or the like by a spring action of the disk between the inner seat 57 and the intermediate seat 58, and an end of the first disk 75 closer to the outer circumference than the intermediate seat 58 is disposed at a position higher than the tip height position in the protruding direction of the intermediate seat 58. Here, since the first disk 75 has a circular plate shape, an end of the outer circumferential side of the first disk 75 tries to return to the flat shape. However, the first disk 75 does not abut the outer seat 59. Here, the placed state is a state in which the first disk 75 is pressed against the seat surface 57a of the inner seat 57, i.e., a state in which a force is not applied from above the first disk 75 toward the disk support section 60 and the intermediate seat 58.

Then, when the disk support section 60 is installed at the position, as schematically shown in FIG. 4B, a portion of the first disk 75 between the inner seat 57 and the intermediate seat 58 is pushed up in the protruding direction of the disk support section 60 or the like. Accordingly, while the first disk 75 is bent such that an intermediate portion between the inner seat 57 and the disk support section 60 is formed in a convex shape in a direction opposite to the protruding direction of the disk support section 60 or the like and a portion further outside than the disk support section 60 tries to return to a flat state, since the first disk 75 abuts the inner seat 57, the intermediate portion between the disk support section 60 and the intermediate seat 58 and the portion further outside than the intermediate seat 58 are bent to form a convex shape in the protruding direction of the intermediate seat 58 or the like.

That is, in a state in which the first disk 75 is pressed against the inner seat 57 to be placed on the intermediate seat 58 and the disk support section 60, the first disk 75 is elastically deformed such that an annular bending section 111' bent in a convex shape is formed at the retainer 33 side (a lower side of FIG. 4B) in the axial direction between the inner seat 57 and the disk support section 60 according thereto, an annular bending section 112' bent in a convex shape is formed at a side (an upper side of FIG. 4B) spaced apart from the retainer 33 between positions in the radial direction at which the disk support section 60 and the outer seat 59 are to be disposed, and a bending section 113' is formed outside in the radial direction of the bending section 112' as becoming closer to the retainer 33 in the axial direction than the outside in the radial direction.

Next, the outer seat 59 is set such that the tip height position in the protruding direction is higher than the first disk 75 in the same position in the radial direction while being pressed against the inner seat 57 and placed on the intermediate seat 58 and the disk support section 60. That is, when only the inner seat 57, the intermediate seat 58 and the disk support section 60 are installed and press the first disk 75 against the seat surface 57a of the inner seat 57 to be placed on the seat surface 58a of the intermediate seat 58 and the seat surface 60a of the disk support section 60, a height position of the first disk 75 at the position in the radial direction at which the outer seat 59 is to be disposed in this state is obtained. Then, a position of the outer seat 59 is set to dispose the seat surface 59a at a position equal to the height position or a high position in the protruding direction. Accordingly, when the outer seat 59 is installed at the position, an abutting portion of the first disk 75 with the seat surface 59a of the outer seat 59 is pushed up in the protruding direction of the outer seat 59 or the like. In addition, while pushed up against the outer seat 59 as described above, the first disk 75 sets the height position of the seat surface 59a of the outer seat 59 such that the placed states of both of the intermediate seat 58 and the disk support section 60 are maintained.

In addition, for example, when the disk support section 60 is disposed at a central position in the radial direction between the inner seat 57 and the intermediate seat 58 and a height H1 from the seat surface 57a of the inner seat 57 to the seat surface 58a of the intermediate seat 58 is assumed to be 1, a height H2 from the seat surface 57a of the inner seat 57 to the seat surface 60a of the disk support section 60 may be 0.3 to 0.5. This is because the disk support section 60 may not abut the first disk 75 when smaller than 0.3 and the first disk 75 may not abut the seat surface 58a of the intermediate seat 58 when larger than 0.5.

When the first disk 75 is assembled to the piston rod 13 with another part as shown in FIG. 3, the first disk 75 is pushed against the inner seat 57 and is placed on the outer seat 59, the intermediate seat 58 and the disk support section 60. In this state, the outer circumferential side of the first disk 75 is pushed up at the outer seat 59, and the second disk 77 is placed at an opposite side of the retainer 33 to receive a biasing force from the second disk 77. Accordingly, a first bending section 111 bent less than the bending section 111' when the outer seat 59 and the second disk 77 are not provided is formed at the first disk 75 between the inner seat 57 and the disk support section 60 to be bent in a convex shape toward the retainer 33 in the axial direction. In addition, a second bending section 112 bent less than the bending section 112' is formed in an annular shape between the disk support section 60 and the outer seat 59 to be bent in a convex shape at a side spaced apart from the retainer 33 in the axial direction. Further, a third bending section 113 bent less than the bending section 113' is formed in annular shape outside the second bending section 112 between the intermediate seat 58 and the outer seat 59 to approach the retainer 33 in the axial direction as it goes outward.

In addition, as the height position in the protruding direction of the seat surface 60a of the disk support section 60 is increased with respect to the height position of the same position in the radial direction of a tangential line connecting the seat surface 57a of the inner seat 57 and the seat surface 58a of the intermediate seat 58 and the height position in the protruding direction of the seat surface 59a of the outer seat 59 is decreased with respect to the height position of the same position in the radial direction of an extension line of the tangential line connecting the seat surface 57a of the inner seat 57 and the seat surface 58a of the intermediate seat 58, the first disk 75 may be elastically deformed in a shape having the first bending section 111, the second bending section 112 and the third bending section 113.

Figure 4C:
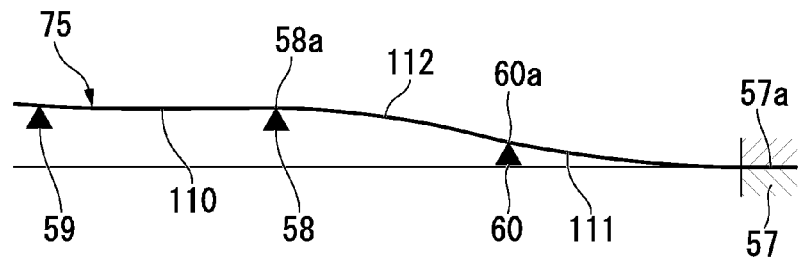
FIG. 4C is a schematic view which shows the setting method of the height of each seat and disk support section of the shock absorber according to the first embodiment of the present invention.

In addition, as the height positions or the like of the outer seat 59 and the intermediate seat 58 are adjusted, as shown in FIG. 4C, an annular bending section 110 bent in a convex shape toward the retainer 33 in the axial direction is formed outside the second bending section 112. As a result, the second bending section 112 is formed at least closer to the disk support section 60 than the outer seat 59.

As shown in FIG. 1, when the first disk 75 is in a non-operating state assembled to the piston rod 13 and no pressure difference is generated between the rod chamber 18 and the bottom chamber 19, the first disk 75 is adhered to the seat surface 57a of the inner seat 57 of the retainer 33 and abuts the seat surface 60a of the disk support section 60, the seat surface 58a of the intermediate seat 58, and the seat surface 59a of the outer seat 59.

The second disk 77 is placed on the first disk 75, and elastically deformed to be disposed at an opposite side of the piston main body 31 in the axial direction as it goes outward in the radial direction along an inner portion in the radial direction from the intermediate seat 58. Accordingly, the second disk 77 presses the first disk 75 toward the intermediate seat 58. Even in this state, the second disk 77 has an outer diameter slightly larger than that of the seat surface 58a of the intermediate seat 58 of the retainer 33 and smaller than an inner diameter of the seat surface 59a of the outer seat 59. In addition, the second disk 77 may press the first disk 75 toward the intermediate seat 58 and may have an outer diameter equal to or smaller than that of the seat surface 58a of the intermediate seat 58 of the retainer 33.

As shown in FIG. 3, in the non-operating state, the disk path hole 106 formed in the single body disk 104 abutting the outer seat 59 of the first disk 75 is formed such that the abutting position with the intermediate seat 58 goes over the outside in the radial direction from the inside in the radial direction. That is, the disk path hole 106 configures a communication path 121 configured to bring a chamber 120 between the intermediate seat 58 and the outer seat 59 in communication with the chamber 65 of the path 66 when the first disk 75 abuts the intermediate seat 58. In other words, the chamber 120 and the path 66 are in constant communication with each other by the disk path hole 106. In addition, as shown by a two-dot chain line in FIG. 3, a path hole 122 configured to bring the path 66 in constant communication with the chamber 120 may be formed by bringing the path concave section 54 and the chamber 120 in communication with the retainer 33 to form a communication path configured to bring the chamber 120 and the path 66 in communication with each other, without forming the disk path hole 106.

In addition, in the non-operating state, the disk notch section 105 formed in the single body disk 104 abutting the outer seat 59 of the first disk 75 causes the abutting position with the outer seat 59 to go over the outside in the radial direction from the inside in the radial direction, and thus brings the chamber 120 between the intermediate seat 58 and the outer seat 59 in constant communication with the bottom chamber 19. That is, the disk notch section 105 constitutes a fixed orifice 125 configured to bring the path 66, i.e., the rod chamber 18, in communication with the bottom chamber 19 via the communication path 121 when the first disk 75 abuts the outer seat 59.

Here, in a state in which the first disk 75 assembled to the piston rod 13 abuts both of the intermediate seat 58 and the outer seat 59, a flow path area of the communication path 121 formed in the disk path hole 106 is larger than that of the fixed orifice 125 formed in the disk notch section 105. In addition, a seat notch section cut out in the outer seat 59 including the seat surface 59a may be formed to form a fixed orifice, without forming the disk notch section 105.

In the non-operating state, the first disk 75 abuts the intermediate seat 58 and the outer seat 59 of the retainer 33 and the disk support section 60 to close the path 66. In addition, even in this state, as shown in FIG. 1, the rod chamber 18 is in communication with the bottom chamber 19 via the path 66, the communication path 121 and the fixed orifice 125. Then, from the non-operating state, when the piston rod 13 is moved to an extension side at which a protrusion amount from the cylinder 11 is increased, the pressure in the rod chamber 18 is increased to be higher than that of the bottom chamber 19 by the piston 12 moved with the piston rod 13.

Here, as shown in FIG. 5, when a piston speed, which is a moving speed of the piston 12, is in a predetermined slow range of 0 to V1, the first disk 75 abuts the intermediate seat 58 and an abutting state with the outer seat 59 is maintained by an elastic force of elastic deformation of the second bending section 112 and the third bending section 113 generated by a positional relation between the inner seat 57, the intermediate seat 58, the outer seat 59 and the disk support section 60. Then, the working fluid flows from the rod chamber 18 toward the bottom chamber 19 at a certain flow path area of the fixed orifice 125 via the path 66, the communication path 121 and the fixed orifice 125. Accordingly, a damping force of 0 to f1 shown in FIG. 5 of orifice properties (the damping force is substantially proportional to a square of the piston speed) is generated.

In addition, when the piston speed is within a predetermined intermediate range of V1 to V2, the first disk 75 is deformed at the outer circumferential section of the seat surface 58a of the intermediate seat 58 as a starting point against the elastic force generated by the elastic deformation of the second bending section 112 and the third bending section 113 while maintaining the abutting state with the intermediate seat 58 by the biasing force of the second disk 77, and the outer circumferential side is separated from the outer seat 59.

Then, the working fluid flows from the rod chamber 18 toward the bottom chamber 19 at a flow path area increased according to the valve opening amount between the first disk 75 and the outer seat 59 larger than the fixed orifice 125 via the path 66 and the communication path 121. Accordingly, in a state in which the piston speed is an intermediate speed, a damping force of f1 to f2 shown in FIG. 5 of valve properties (the damping force is substantially in proportion to the piston speed) of a first stage is generated in response to the valve opening amount between the outer seat 59 and the first disk 75.

In addition, when a force needed to separate a portion further outside than the intermediate seat 58 of the first disk 75 from the outer seat 59 is set to a small value by a positional relation between the inner seat 57, the intermediate seat 58, the outer seat 59 and the disk support section 60, a minimum damping force f1 of the valve properties of the first stage can approach 0. When the force needed to separate the portion further outside than the intermediate seat 58 of the first disk 75 from the outer seat 59 is set as a large value, the minimum damping force f1 can be increased according thereto. In addition, even when the elastic force of the first disk 75 (the number, a plate thickness, or the like, of single body disks 104) is increased, the minimum damping force f1 can be increased. In addition, an inclination of the valve properties of the first stage can be varied by varying an area of the communication path 121 exceeding the intermediate seat 58.

Further, when the piston speed is within a predetermined rapid range of V2 or more, the first disk 75 is deformed at the outer circumferential section of the seat surface 57a of the inner seat 57 as a starting point against the elastic force generated by the elastic deformation thereof and the biasing force of the second disk 77, and separated from the intermediate seat 58. Then, the working fluid flows from the rod chamber 18 toward the bottom chamber 19 at a flow path area increased in response to the valve opening amount between the first disk 75 and the intermediate seat 58 larger than the communication path 121 via the path 66. Accordingly, a damping force of f2 or more shown in FIG. 5 of valve properties of a second stage in response to the valve opening amount between the intermediate seat 58 and the first disk 75 is generated.

In addition, in the valve properties of the second stage, an increasing rate of the damping force with respect to the piston speed becomes smaller than that of the valve properties of the first stage. A minimum damping force f2 of the valve properties of the second stage can be varied by a stepped amount between the intermediate seat 58 and the inner seat 57 and the elastic force (the plate thickness, the number, or the like, of single body disks 114) of the second disk 77.

Accordingly, in the path 66 formed in the piston main body 31 and the retainer 33, when the piston rod 13 moved to the extension side and the piston 12 is slid integrated with the piston rod 13 in the cylinder 11, the working fluid flows from the rod chamber 18 toward the bottom chamber 19 by the sliding movement.

Then, the piston main body 31 and the retainer 33 through which the path 66 passes, the annular outer seat 59 protruding to the retainer 33, the annular inner seat 57 protruding into the outer seat 59 of the retainer 33, the annular intermediate seat 58 protruding between the outer seat 59 and the inner seat 57 of the retainer 33 to surround the opening section of the path 66, the disk support section 60 protruding between the intermediate seat 58 and the inner seat 57, having the tip height position in the protruding direction higher than that of the inner seat 57 and lower than that of the intermediate seat 58, and continuously or discontinuously disposed in an annular shape, the first disk 75 placed on the outer seat 59, the inner seat 57, the intermediate seat 58 and the disk support section 60, the second disk 77 placed on the first disk 75, and the communication path 121 configured to bring the chamber 120 and between the intermediate seat 58 and the outer seat 59 in communication with the path 66 configure a damping force generating mechanism 131 of an extension side installed at a portion of the path 66 and configured to suppress a flow of the working fluid to generate a damping force.

In the shock absorber disclosed in Japanese Unexamined Patent Application, First Publication No. H02-66333, among the outer seat, the intermediate seat and the inner seat, the height of the intermediate seat is smaller than that of the inner seat and the outer seat, the disk adhered to and clamped by the inner seat is pressed against the intermediate seat by the spring, and thus the set load is applied to the disk. In this structure, since the set load to the outer circumferential seat of the disk is increased and the valve opening point is also increased, it cannot be said that the valve properties are appropriate. That is, in obtaining the plurality of stages of damping force properties by raising the outer seat higher than the intermediate seat, when the member having the inner seat, the intermediate seat and the outer seat is manufactured through, for example, sintering, a height relation between the inner seat, the intermediate seat and the outer seat may be deviated by a manufacturing deviation (tolerance). When the height relation of the inner seat, the intermediate seat and the outer seat is deviated, the disk cannot simultaneously abut the inter- mediate seat and the outer seat, a gap is generated and the working fluid is leaked, and thus desired damping force properties may not be obtained. For this reason, as disclosed in Japanese Unexamined Patent Application, First Publication No. H02-66333, the height of the intermediate seat is made to be smaller than that of the inner seat and the outer seat, and the disk is pressed by the spring so as to abut both the intermediate seat and the outer seat. However, in a structure in which the disk is pressed by the spring to abut the outer seat and the intermediate seat having the height lower than that of the outer seat, the set load of the disk to the outer seat is increased and the valve opening point is also increased.

In addition, in the shock absorber disclosed in Japanese Unexamined Patent Application, First Publication No. 2011-179550, the height of the intermediate seat becomes higher than that of the inner seat, the disk support section is installed to connect the seats, and the height of the outer seat becomes higher than that of the intermediate seat. Then, as the disk is clamped to be adhered to the inner seat, the disk is elastically deformed along the disk support section, the intermediate seat and the outer seat to generate a set load by the elastic force. In this case, since the disk is elastically deformed such that the outer circumferential side is separated from the piston in the axial direction and the valve opening direction is a direction of increasing deformation, the set load of the disk to the outer seat is increased and the valve opening point is also increased.

On the other hand, according to the shock absorber of the first embodiment, the tip height position in the protruding direction of the disk support section 60 is higher than the first disk 75 in the same position in the radial direction in a state in which the first disk 75 is pressed against the inner seat 57 to be placed on the intermediate seat 58, and the tip height position in the protruding direction of the outer seat 59 is higher than the first disk 75 in the same position in the radial direction in a state in which the first disk 75 is pressed against the inner seat 57 to be placed on the intermediate seat 58 and the disk support section 60. Accordingly, the first disk 75 is elastically deformed such that the first bending section 111 bent in a convex shape is formed at the retainer 33 between the inner seat 57 and the disk support section 60, and the second bending section 112 bent in a convex shape toward a side spaced apart from the retainer 33 is formed between the disk support section 60 and the outer seat 59. Then, the first disk 75 is elastically deformed as described above to abut the outer seat 59 at the third bending section 113 of the outer circumferential side of the second bending section 112 by the elastic force. In this way, since the first disk 75 is elastically deformed in a shape having the second bending section 112 bent in a convex shape toward a side spaced apart from the retainer 33 between the disk support section 60 and the outer seat 59 to abut the outer seat 59, a separation direction from the outer seat 59 coincides with a direction of returning to a flat natural state. Accordingly, the set load can be suppressed to a low level even when the manufacturing deviation (tolerance) is absorbed. Accordingly, since the first disk 75 is easily separated from the outer seat 59 and an increase of the valve opening point can be suppressed, the valve properties can be optimized.

In addition, since neither an increase in the number of disks nor use of a protruded disk or coil spring is needed, a cost can be reduced and a length in the axial direction can be reduced.

Further, since the disk support section 60 causes the first disk 75 to appropriately abut the intermediate seat 58 and the outer seat 59, a stable damping force can be obtained.

Furthermore, a step difference h between the inner seat 57 and the intermediate seat 58 can be largely secured, and a stable damping force at the intermediate speed can be obtained.

In addition, since the disk support section 60 is disposed between the neighboring paths 66 in the circumferential direction of the retainer 33, an increase in the size in the radial direction of the shock absorber as well as an increase in size in the radial direction of the retainer 33 can be suppressed.

In addition, since the second disk 77 having a smaller diameter than the first disk 75 is placed on the first disk 75, the first disk 75 can abut the intermediate seat 58 even when separated from the outer seat 59. Accordingly, the valve properties of the first stage and the second stage can be obtained.

Further, since the third bending section 113 approaching to the retainer 33 at the outside the second bending section 112 is formed at the first disk 75 between the intermediate seat 58 and the outer seat 59, the manufacturing deviation can be absorbed and the set load can be suppressed to a low level.

Second Embodiment

Next, a second embodiment will be described with reference to mainly FIGS. 6 and 7 focusing on differences from the first embodiment. In addition, the same components as in the first embodiment are referred to by the same names and designated by the same reference numerals.

In the second embodiment, the second disk 77 is configured by the two single body disks 114 and has a third disk 155 disposed between the second disk 77 and the spacer 78 and stacked thereon. Like the second disk 77, an insertion hole 156 is also formed in the third disk 155 at a center in the radial direction, and the attachment shaft section 26 of the piston rod 13 is inserted into the insertion hole 156.

The third disk 155 is configured by stacking a plurality of (specifically two) single body disks 157 having the same diameter and circular plate shape, and has an outer diameter larger than that of the seat surface 60a of the disk support section 60 and smaller than the inner diameter of the seat surface 58a of the intermediate seat 58. In a natural state before assembly to the piston rod 13, front and rear surfaces of the single body disk 157 have a flat shape disposed at a certain position in the axial direction, i.e., a flat plate shape, and thus the third disk 155 also has the same flat shape, i.e., the flat plate shape.

In the non-operating state, the third disk 155 abuts the second disk 77, and like the second disk 77, is elastically deformed to be disposed at an opposite side of the piston main body 31 in the axial direction as it goes outward in the radial direction along a portion of the first disk 75 further inside in the radial direction than the disk support section 60. Even in this state, the third disk 155 has an outer diameter slightly larger than that of the seat surface 60a of the disk support section 60 of the retainer 33 and smaller than the inner diameter of the seat surface 58a of the intermediate seat 58.

Figure 6:
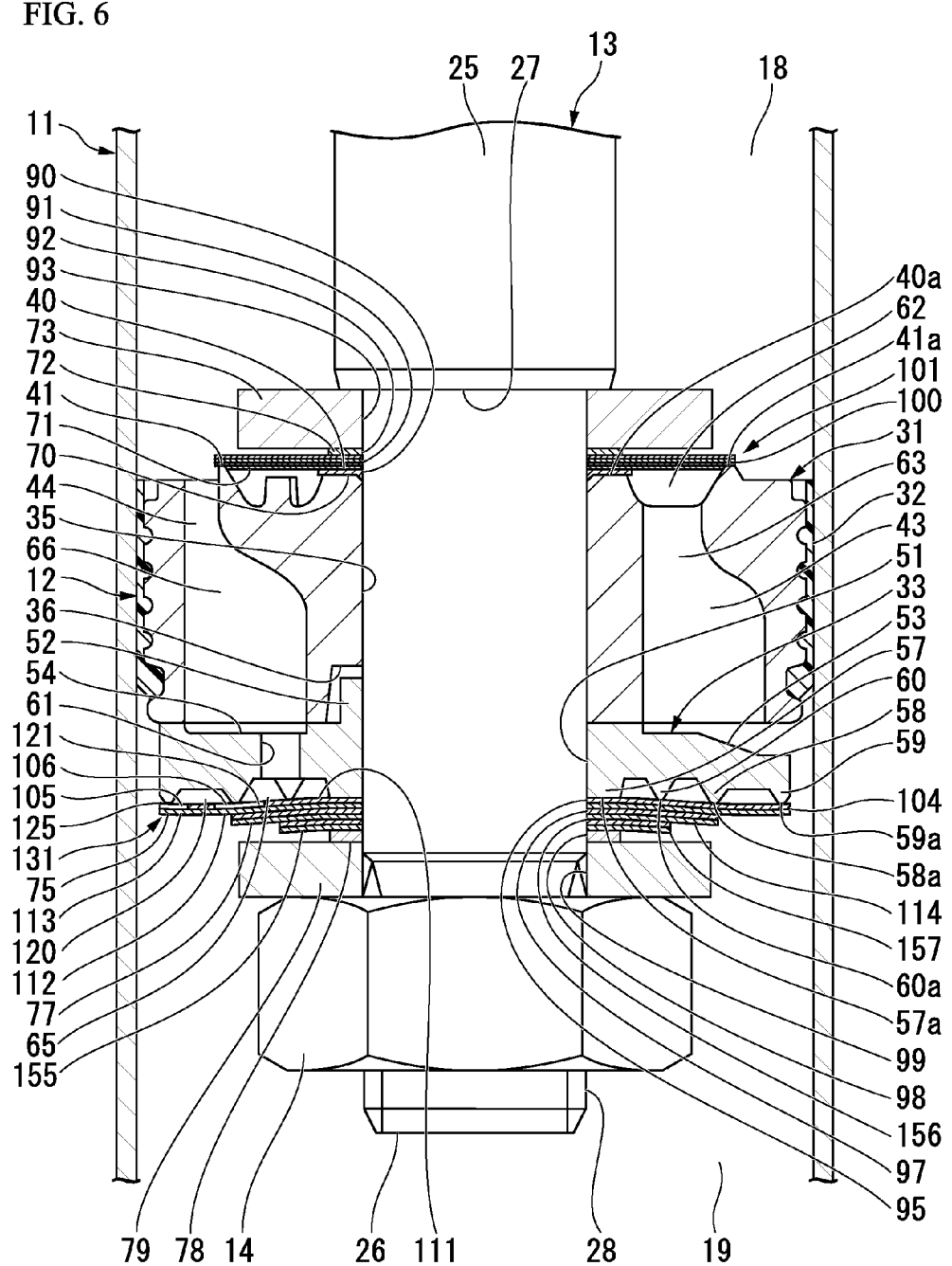
FIG. 6 is a partial cross-sectional view of a shock absorber according to a second embodiment of the present invention.

From a non-operating state shown in FIG. 6, when the piston rod 13 is moved to the extension side at which a protrusion amount from the cylinder 11 is increased, the pressure in the rod chamber 18 becomes higher than that in the bottom chamber 19 side by the piston 12 moved with the piston rod 13.

Figure 7:
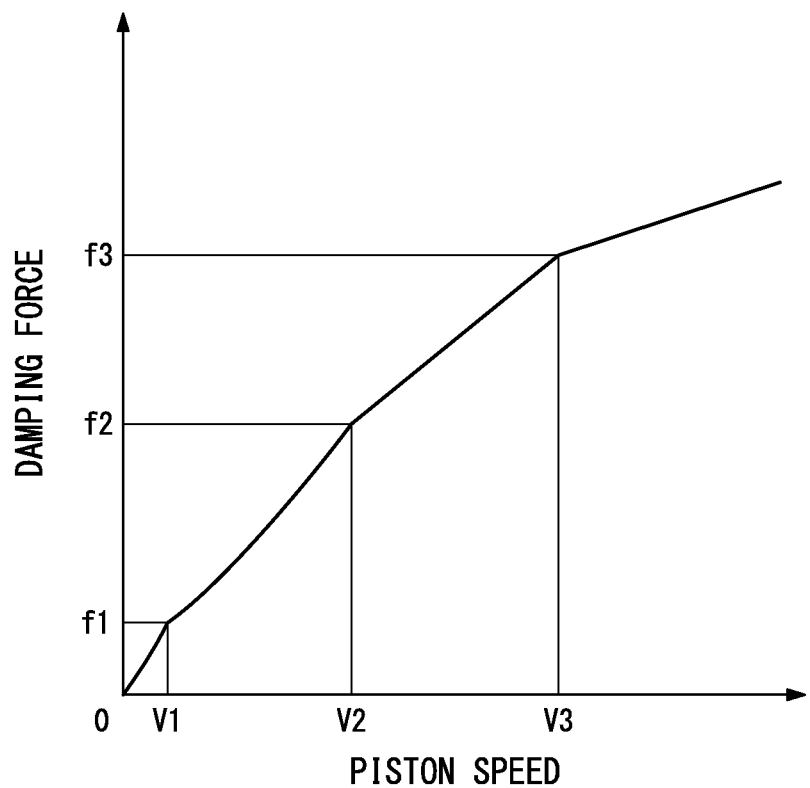
FIG. 7 is a characteristic diagram showing damping force properties of the shock absorber according to the second embodiment of the present invention.

Here, as shown in FIG. 7, when a piston speed is within a predetermined slow range of 0 to V1, like the first embodiment, a state in which the first disk 75 abuts the outer seat 59 is maintained, a working fluid flows from the rod chamber 18 toward the bottom chamber 19 at a constant flow path area of the fixed orifice 125 via the path 66, the communication path 121 and the fixed orifice 125, and a damping force of 0 to f1 shown in FIG. 7 of the orifice properties is generated.

In addition, when the piston speed is within a predetermined intermediate range V1 to V2, like the first embodiment, the first disk 75 is deformed from the outer circumferential section of the seat surface 58a of the intermediate seat 58 as a starting point and the outer circumferential side is spaced apart from the outer seat 59 while maintaining an abutting state with the intermediate seat 58, a working fluid flows from the rod chamber 18 toward the bottom chamber 19 at a flow path area increased in response to the valve opening amount between the first disk 75 and the outer seat 59 via the path 66 and the communication path 121, and a damping force of f1 to f2 shown in FIG. 7 of the valve properties of the first stage in response to the valve opening amount between the outer seat 59 and the first disk 75 is generated.

Further, when the piston speed is within a predetermined range of V2 to V3, which is higher than the intermediate range, the first disk 75 is deformed from the outer circumferential section of the seat surface 60a of the disk support section 60 as a starting point against a biasing force of the second disk 77 to be spaced apart from the intermediate seat 58 while maintaining the abutting state with the disk support section 60. Then, a working fluid flows from the rod chamber 18 toward the bottom chamber 19 at a flow path area larger than the communication path 121 and increased in response to the valve opening amount between the first disk 75 and the intermediate seat 58 via the path 66. Accordingly, a damping force of f2 to f3 shown in FIG. 7 of the valve properties of the second stage in response to the valve opening amount between the intermediate seat 58 and the first disk 75 is generated. The valve properties of the second stage have an increasing rate of the damping force with respect to the piston speed that becomes lower than that of the valve properties of the first stage.

Further, when the piston speed is within a predetermined high speed range of V3 or more, the first disk 75 is deformed from the outer circumferential section of the seat surface 57a of the inner seat 57 as a starting point against the biasing force of the second disk 77 and the third disk 155 to be spaced apart from the disk support section 60 and further spaced apart from the intermediate seat 58. Then, the working fluid flows from the rod chamber 18 toward the bottom chamber 19 at a flow path area increased in response to the valve opening amount between the first disk 75 and the intermediate seat 58 larger than the communication path 121 via the path 66. Accordingly, a damping force of f3 or more shown in FIG. 7 of the valve properties of the third stage in response to the valve opening amount between the intermediate seat 58 and the first disk 75 is generated. The valve properties of the third stage have an increasing rate of the damping force with respect to the piston speed lower than that of the valve properties of the second stage.

According to the second embodiment having the above-mentioned configuration, since the disk support section 60 is installed between the intermediate seat 58 and the inner seat 57 of the retainer 33 and the third disk 155 having a diameter smaller than the intermediate seat 58 and larger than the disk support section 60 is stacked on the second disk 77, damping force properties of the valve properties of the multiple stages can be obtained.

In addition, while the first and second embodiments have been exemplarily described regarding the case in which both of the intermediate seat 58 and the outer seat 59 are circular seats, at least one of the intermediate seat 58 and the outer seat 59 may have a variant seat such as a petal form or the like, rather than the circular shape.

Further, the plurality of intermediate seats 58 may be concentrically formed.

Furthermore, while the first and second embodiments show an example in which the present invention is applied to the damping force generating mechanism of the extension side of the piston, the present invention is not limited thereto but the present invention may be applied to a damping force generating mechanism of a compression side of the piston.

In addition, while the first and second embodiments have exemplarily described the case in which the separate retainer 33 is installed at the piston main body 31, and the inner seat 57, the intermediate seat 58, the outer seat 59, the disk support section 60, and the path 66 in constant communication with the rod chamber 18 are installed at the retainer 33, these may be installed at the piston main body 31. In this case, in addition thereto, the path 63 in constant communication with the bottom chamber 19 should be installed at the piston main body 31.

Figure 8:
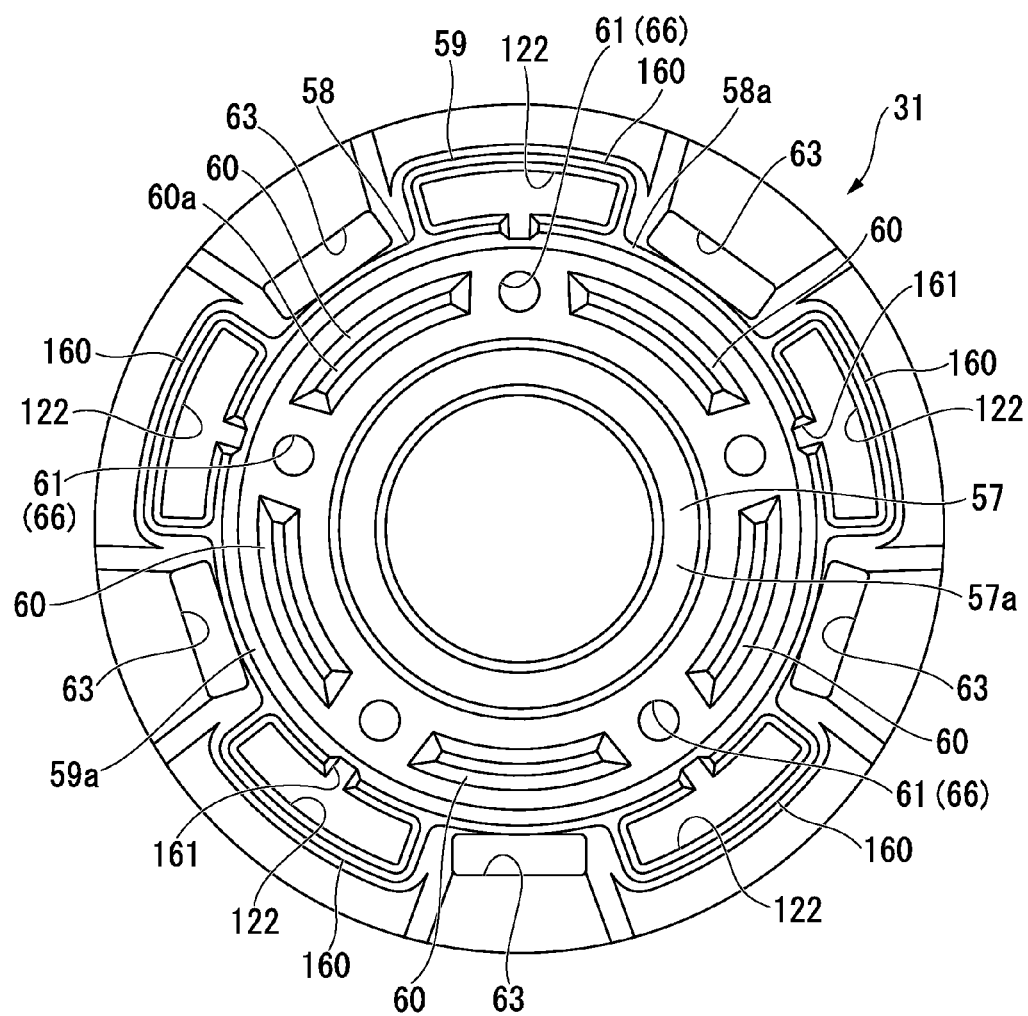
FIG. 8 is a plan view showing a modified example of a piston main body used in the shock absorber of the first and second embodiment of the present invention.

For example, as shown in FIG. 8, when the path hole 122 (the path hole 122 shown in FIG. 3 configured to bring the rod chamber 18 of FIG. 1 in constant communication with the chamber 120) is formed, a plurality of outer seat configuration sections 160 are formed to protrude outward in the radial direction from a partial position in the circumferential direction of the intermediate seat 58, and the path hole 122 is formed between the outer seat configuration sections 160 and the intermediate seat 58. Then, the path 63 (the path 63 in constant communication with the bottom chamber 19 of FIG. 1) is formed between the neighboring outer seat configuration sections 160 in the circumferential direction. In this case, the outer seat 59 is constituted by the plurality of outer seat configuration sections 160 and the intermediate seat 58 between the neighboring outer seat configuration sections 160 in the circumferential direction to form an annular shape in a petal form. Then, a portion of the intermediate seat 58 which does not configure the outer seat 59 is disposed between the outer seat 59 and the inner seat 57. A path groove 161 passing in the radial direction is formed at a position in the circumferential direction of the intermediate seat 58 that meets with the outer seat configuration section 160, and a disk path hole 106 of the single body disk 104 of the first disk 75 shown in FIG. 3 may be omitted.

Third Embodiment

Next, a third embodiment will be described mainly with reference to FIGS. 9 to 14 focusing on differences from the first embodiment. In addition, the same components as the first embodiment will be referred to by the same names and designated by the same reference numerals.

Figure 9:
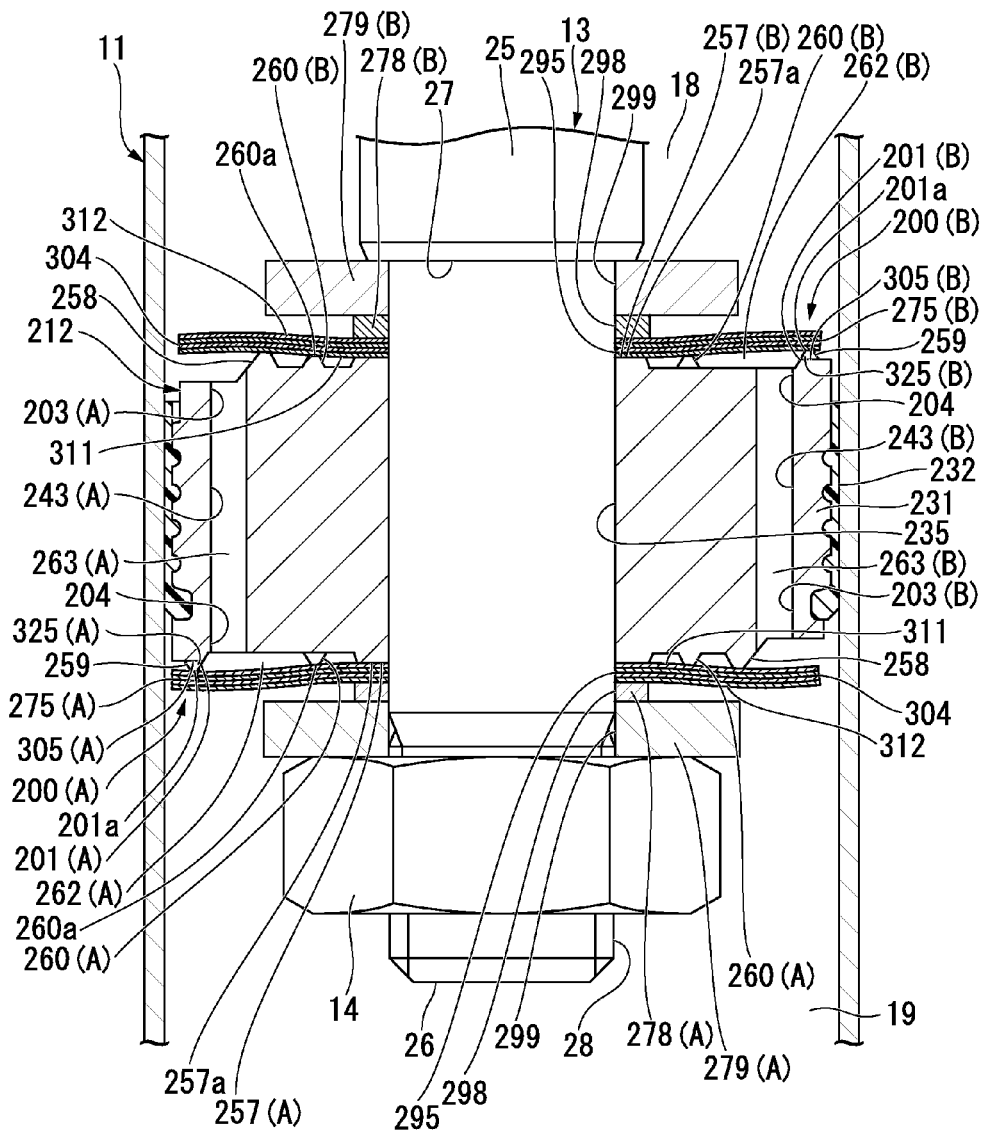
FIG. 9 is a partial cross-sectional view of a shock absorber according to a third embodiment of the present invention.

As shown in FIG. 9, a shock absorber of the third embodiment has a piston main body (a valve main body) 231 having a substantially circular plate shape and integrated with a piston 212 connected to the piston rod 13 by the nut 14 and sliding in the cylinder 11 through sintering, and an annular sliding contact member 232 mounted on the outer circumferential surface of the piston main body 231 and in sliding contact with the inside of the cylinder 11. In addition, the retainer like the first embodiment is not installed at the piston 212.

Both sides in the axial direction of the piston main body 231 have a common shape. One side in the axial direction of the piston main body 231 constitutes a damping force generating mechanism of an extension side, and the other side constitutes a damping force generating mechanism of a compression side. For this reason, when these mechanisms should be distinguished, (A) is added to reference numerals of the damping force generating mechanism 200 of the extension side and components thereof, and (B) is added to reference numerals of the damping force generating mechanism 200 of the compression side and components thereof.

An insertion hole 235 having a linear shape is formed on a central axis of the piston main body 231 of the third embodiment to pass therethrough. An annular inner seat 257 protruding in the axial direction outside the insertion hole 235 in the radial direction and an annular outer seat 201 protruding in the axial direction further outside than the inner seat 257 in the radial direction are formed at both end sections in the axial direction of the piston main body 231. A seat surface 257a of the protrusion tip of the inner seat 257 has a constant height position in the axial direction of the piston main body 231 and is formed in a direction perpendicular to an axis of the piston main body 231. A seat surface 201a of the protrusion tip of the outer seat 201 also has a constant height position in the axial direction of the piston main body 231 and is formed in a direction perpendicular to the axis of the piston main body 231.

Figure 10:
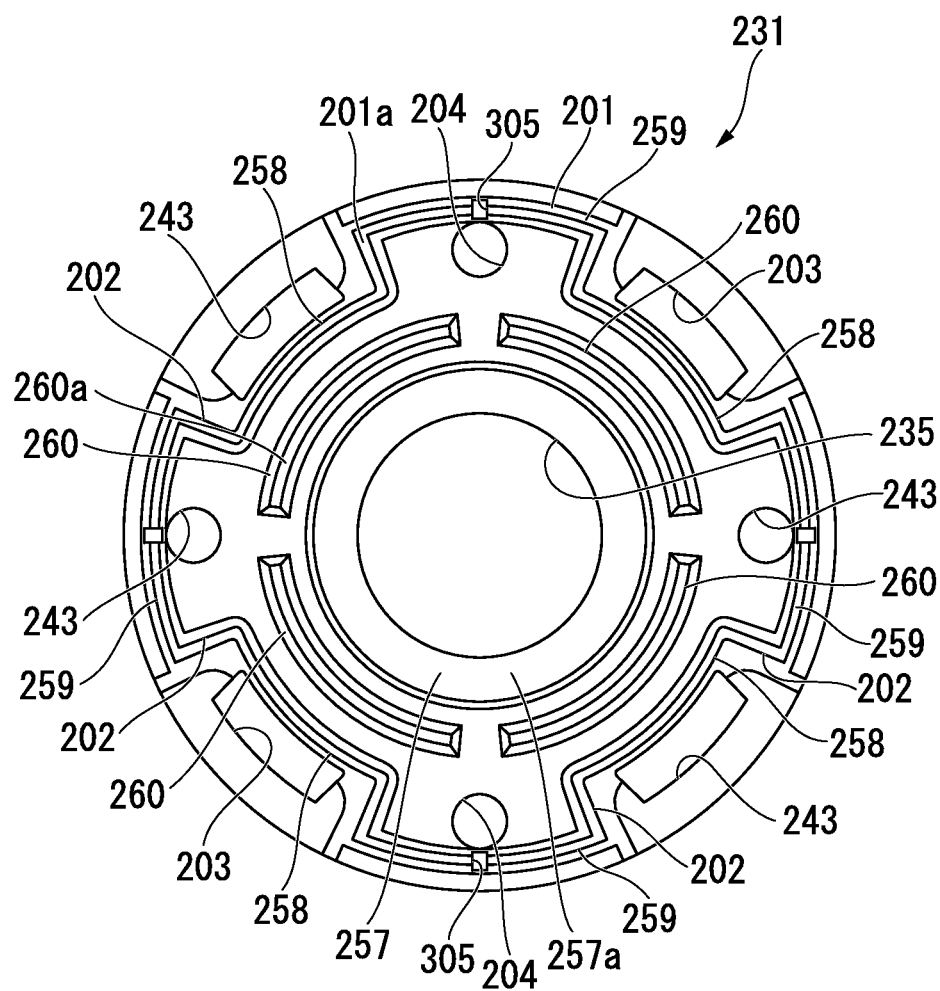
FIG. 10 is a plan view showing a piston main body used in the shock absorber according to the third embodiment of the present invention.

The inner seat 257 has an annular shape to surround the insertion hole 235. Specifically, the inner seat 257 has an annular shape concentric with the insertion hole 235. As shown in FIG. 10, the outer seat 201 has an annular shape to surround the inner seat 257, and includes a plurality of (specifically four) arc-shaped intermediate protrusion sections 258 having a diameter larger than that of the inner seat 257 and a plurality of (specifically four) arc-shaped outer protrusion sections 259 having a diameter larger than that of the intermediate protrusion section 258. The plurality of intermediate protrusion sections 258 have an arc shape concentric with the insertion hole 235, and are discontinuously disposed on the same circle at equal intervals in an annular shape. The plurality of outer protrusion sections 259 also have an arc shape concentric with the insertion hole 235, and are discontinuously disposed on the same circle at equal intervals in an annular shape. The intermediate protrusion sections 258 and the outer protrusion sections 259 are alternately formed in the circumferential direction of the piston main body 231. A notch section 305 passing in the radial direction is formed in the outer protrusion section 259 to be concaved from the seat surface 201a in the axial direction.

End sections of the intermediate protrusion section 258 and the outer protrusion section 259 close to each other and neighboring in the circumferential direction of the piston main body 231 are connected by a connecting protrusion section 202 in the radial direction of the piston main body 231. Accordingly, the outer seat 201 forms an annular shape different from the circular shape, and forms a petal shape. In addition, in the piston main body 231, positions in the circumferential direction of the outer protrusion section 259 of the outer seat 201 of one side in the axial direction and the intermediate protrusion section 258 of the outer seat 201 of the other side in the axial direction are matched with each other, and positions in the circumferential direction of the intermediate protrusion section 258 of the outer seat 201 of one side in the axial direction and the outer protrusion section 259 of the outer seat 201 of the other side in the axial direction are matched with each other.

A plurality of (specifically eight) path holes 243 are formed in the piston main body 231 to pass lineary parallel to the axial direction at intervals in the circumferential direction. The path hole 243 has one side in the axial direction, which is an inlet hole section 203 having a long arc shape in the circumferential direction of the piston main body 231, and the other side in the axial direction, which is an outlet hole section 204 having a circular shape smaller than the inlet hole section 203. All of the inlet hole sections 203 of the plurality of path holes 243 are disposed at a central position of the intermediate protrusion section 258 in the circumferential direction of the piston main body 231 and an outer position of the intermediate protrusion section 258 in the radial direction of the piston main body 231. In addition, all of the outlet hole sections 204 of the plurality of path holes 243 are disposed at a central position of the outer protrusion section 259 in the circumferential direction of the piston main body 231 and an inner position of the outer protrusion section 259 in the radial direction of the piston main body 231. The path holes 243 are formed with respect to all sets of the intermediate protrusion sections 258 and the outer protrusion sections 259 of both sides in the axial direction, the positions in the circumferential direction of which are matched with each other. Accordingly, the path holes 243 having the same shape are alternately disposed to be opposite to each other in the circumferential direction of the piston main body 231. The plurality of path holes 243 having the outlet hole sections 204 in the axial direction of the piston main body 231 and a chamber 262 further inside than the outer seat 201 surrounding the outlet hole section 204 as shown in FIG. 9 configure one path 263, and thus the two paths 263 are formed in the piston main body 231 to be opposite to each other in the axial direction.

A plurality of (specifically four) disk support sections 260 protruding in the axial direction from between the intermediate protrusion section 258 and the inner seat 257 in the radial direction are formed at the piston main body 231. As shown in FIG. 10, the disk support sections 260 have an arc shape concentric with the insertion hole 235, and are discontinuously disposed on the same circle in an annular shape. The disk support sections 260 are disposed to surround the inner seat 257 at equal intervals.

As shown in FIG. 9, the piston main body 231 is attached to the piston rod 13 and disposed in the cylinder 11 in a state in which the attachment shaft section 26 of the piston rod 13 is inserted into the insertion hole 235. In this state, the path 263(A) having the path hole 243(A) with the inlet hole section 203(A) directed toward the rod chamber 18 is in constant communication with the rod chamber 18 configured to bring the rod chamber 18 in communication with the bottom chamber 19, and configures the damping force generating mechanism 200(A) of the extension side. In addition, the path 263(B) having the path hole 243(B) with the inlet hole section 203(B) directed toward the bottom chamber 19 is in constant communication with the bottom chamber 19 configured to bring the rod chamber 18 in communication with the bottom chamber 19, and configures the damping force generating mechanism 200(B) of the compression side.

A disk 275(A), a spacer 278(A) and a restriction member 279(A) configuring the damping force generating mechanism 200(A) of the extension side are installed at the piston main body 231 near the bottom chamber 19 in the axial direction in sequence from the piston main body 31 side in the axial direction. Similarly, a disk 275(B), a spacer 278(B) and a restriction member 279(B) configuring the damping force generating mechanism 200(B) of the compression side are also installed at the piston main body 231 near the rod chamber 18 in the axial direction. An insertion hole 295 is formed at a center in a radial direction of a disk 275, an insertion hole 298 is formed at a center in a radial direction of a spacer 278, and an insertion hole 299 is formed at a center in a radial direction of a restriction member 279, which pass in the axial direction.

Then, the attachment shaft section 26 of the piston rod 13 is sequentially inserted into the insertion hole 299 of the restriction member 279(B), the insertion hole 298 of the spacer 278(B), the insertion hole 295 of the disk 275(B), the insertion hole 235 of the piston main body 231, the insertion hole 295 of the disk 275(A), the insertion hole 298 of the spacer 278(A), and the insertion hole 299 of the restriction member 279(A), and in this state, the nut 14 is threadedly engaged with the male screw 28 of the attachment shaft section 26. Then, all of the restriction member 279(B), the spacer 278(B), the disk 275(B), the piston main body 231, the disk 275(A), the spacer 278(A) and the restriction member 279(A) are stacked to restrict movement in the radial direction at the attachment shaft section 26, and sandwiched between the stepped section 27 of the piston rod 13 and the nut 14 in the stacked state. Here, the disks 275(A) and (B) are clamped such that only inner circumferential sides thereof cannot move with respect to the piston rod 13 in the axial direction.

The disk 275 is configured by stacking a plurality of (specifically four) single body disks 304 having the same diameter and circular plate shape, and has an outer diameter larger than that of a portion of the seat surface 201a of the outer seat 201 that configures the outer protrusion section 259. In a natural state before assembly with the piston rod 13, front and rear surfaces of the single body disks 304 have a flat shape disposed at a certain position in the axial direction, i.e., a flat plate shape. Accordingly, the disk 275 also has the same flat shape, i.e., the flat plate shape.

The spacer 278 has an annular shape having an outer diameter substantially equal to that of the seat surface 257a of the inner seat 257. The restriction member 279 has an annular shape having an outer diameter substantially equal to a diameter of a portion of the seat surface 201a of the outer seat 201 that constitutes the intermediate protrusion section 258.

In the third embodiment, a relation between the tip height positions in the protruding direction of the inner seat 257, the intermediate protrusion section 258 of the outer seat 201, the outer protrusion section 259 of the outer seat 201 and the disk support section 260 is the same as that of the tip height positions in the protruding direction of the inner seat 57, the intermediate seat 58, the outer seat 59 and the disk support section 60 of the first embodiment. Here, the inner seat 257 corresponds to the inner seat 57, the intermediate protrusion section 258 of the outer seat 201 corresponds to the intermediate seat 58, the outer protrusion section 259 of the outer seat 201 corresponds to the outer seat 59, and the disk support section 260 corresponds to the disk support section 60.

Specifically, in the tip height positions in the protruding direction of the outer seat 201 and the disk support section 260, provided that the protruding direction is a forward direction, the tip height position in the protruding direction of the outer seat 201 including the intermediate protrusion section 258 and the outer protrusion section 259 is higher than that in the protruding direction of the inner seat 257. In addition, the tip height position in the protruding direction of the disk support section 260 is higher than that in the protruding direction of the inner seat 257 and lower than that in the protruding direction of the outer seat 201.

In other words, the height position of the seat surface 201a of the tip in the protruding direction of the outer seat 201 including the intermediate protrusion section 258 and the outer protrusion section 259 is higher than that in the protruding direction of the seat surface 257a of the tip in the protruding direction of the inner seat 257. In addition, a height position in a protruding direction of a seat surface 260a of the tip in the protruding direction of the disk support section 260 is higher than that in the protruding direction of the seat surface 257a of the tip in the protruding direction of the inner seat 257, and the height position in the protruding direction of the seat surface 201a of the outer seat 201 is higher than that in the protruding direction of the seat surface 260a of the tip in the protruding direction of the disk support section 260.

Here, the tip height positions in the protruding direction of the inner seat 257, the intermediate protrusion section 258 of the outer seat 201, the outer protrusion section 259 of the outer seat 201 and the disk support section 260 are set to elastically deform the disk 275 having the flat plate shape into the following shape.

Figure 11A:
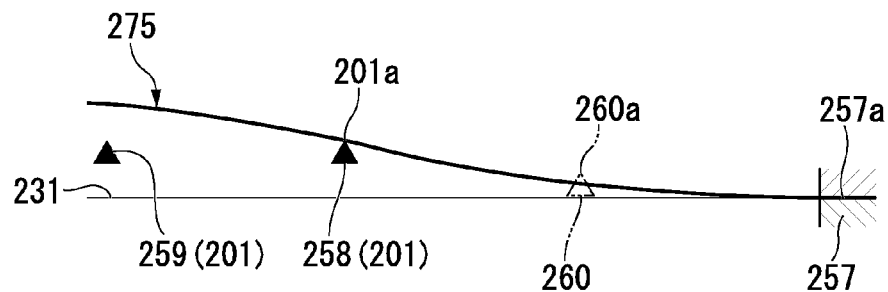
FIG. 11A is a schematic view which shows a setting method of a height of each seat and disk support section of the shock absorber according to the third embodiment of the present invention.
Figure 11B:
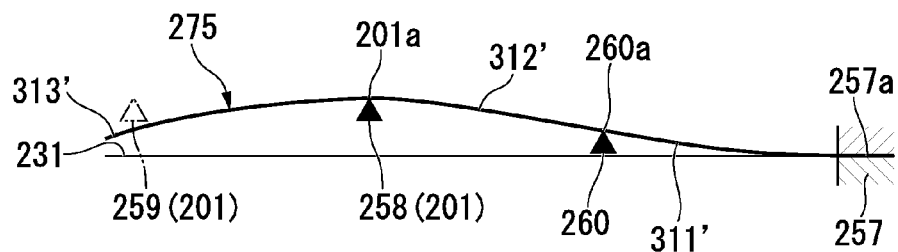
FIG. 11B is a schematic view which shows the setting method of the height of each seat and disk support section of the shock absorber according to the third embodiment of the present invention.

First, as shown in FIGS. 11A and 11B, the inner seat 257, the intermediate protrusion section 258 of the outer seat 201 and the disk support section 260 are set in the same manner as the inner seat 57, the intermediate seat 58 and the disk support section 60 of the first embodiment. That is, as shown in FIG. 11A, the height position of the disk 275 of the position in the radial direction at which the disk support section 260 is to be disposed in a state in which only the inner seat 257 and the intermediate protrusion section 258 are installed to press the disk 275 against the seat surface 257a of the inner seat 257 is obtained, and the position of the disk support section 260 is set to dispose the seat surface 260a at a position higher than the height position.

When the disk support section 260 is installed at the position described above, as shown in FIG. 11B, the disk 275 is elastically deformed such that an annular bending section 311' bent in a convex shape toward the piston main body 231 (a lower side of FIG. 11B) in the axial direction is formed between the inner seat 257 and the disk support section 260, an annular bending section 312' bent in a convex shape toward a side (an upper side of FIG. 11B) spaced apart from the piston main body 231 is formed between the disk support section 260 and the position in the radial direction at which the outer protrusion section 259 is to be disposed, and a bending section 313' that approaches the piston main body 231 (a lower side of FIG. 11B) in the axial direction as it goes outward in the radial direction is formed outside in the radial direction of the bending section 312'.

Next, the outer protrusion section 259 of the outer seat 201 is set such that the tip height position in the protruding direction is higher than the disk 275 in the same position in the radial direction while being pressed against the inner seat 257 and placed on the intermediate protrusion section 258 and the disk support section 260. Then, a first bending section 311 having a curvature slightly smaller than that of a bending section 311' when the outer protrusion section 259 is not provided is formed at the disk 275 between the inner seat 257 and the disk support section 260 to be bent in a convex shape toward the piston main body 231 in the axial direction. In addition, a second bending section 312 having a curvature slightly smaller than that of the bending section 312' is formed between the disk support section 260 and the outer protrusion section 259 in an annular shape bent in a convex shape at a side spaced apart from the piston main body 231 in the axial direction.

Figure 11C:
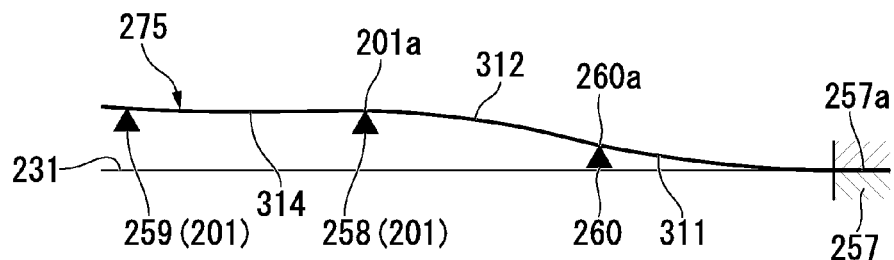
FIG. 11C is a schematic view which shows the setting method of the height of each seat and disk support section of the shock absorber according to the third embodiment of the present invention.

Here, as the height positions or the like of the outer protrusion section 259 and the intermediate protrusion section 258 of the outer seat 201 are adjusted, provided that the connecting protrusion section 202 is not provided on the outer seat 201, as shown in FIG. 11C, an annular bending section 314 bent in a convex shape is formed at the piston main body 231 in the axial direction outside the second bending section 312. As the connecting protrusion section 202 is formed at the outer seat 201, the disk 275 forms a shape in which at least a portion of the bending section 314 abutting the outer seat 201 is flat, and as a result, the second bending section 312 is at least formed closer to the disk support section 260 than the intermediate protrusion section 258 of the outer seat 201.

When the disk 275 assembled to the piston rod 13 with another part as shown in FIG. 9, the disk 275 is pressed against the inner seat 257 to be placed on the outer protrusion section 259 of the outer seat 201, the connecting protrusion section 202 of the outer seat 201, the intermediate protrusion section 258 of the outer seat 201 and the disk support section 260. In this state, an outer circumferential side of the disk 275 is raised at the outer seat 201. Accordingly, the disk 275 is elastically deformed such that the first annular bending section 311 bent in a convex shape toward the piston main body 231 in the axial direction is formed between the inner seat 257 and the disk support section 260 and the second annular bending section 312 bent in a convex shape toward a side spaced apart from the piston main body 231 is formed between the disk support section 260 and the intermediate protrusion section 258 of the outer seat 201.

As shown in FIG. 9, the disk 275 is adhered to the seat surface 257a of the inner seat 257 of the piston main body 231 as described above, and abuts the seat surface 260a of the disk support section 260 and the seat surface 201a of the outer seat 201 in a non-operating state in which the disk 275 is assembled to the piston rod 13 and no pressure difference is provided between the rod chamber 18 and the bottom chamber 19.

During the non-operating state, the notch section 305 formed in the outer protrusion section 259 of the outer seat 201 passes through the outer protrusion section 259 from the inside in the radial direction to the outside in the radial direction even when the disk 275 abuts the outer seat 201 including the outer protrusion section 259. Accordingly, in the disk 275(A) of the bottom chamber 19 side, the chamber 262(A) between the outer seat 201(A) and the inner seat 257(A) abutting therewith is in communication with the bottom chamber 19 at the notch section 305(A). That is, the notch section 305(A) configures a fixed orifice 325(A) configured to bring the path 263(A), i.e., the rod chamber 18, in communication with the bottom chamber 19 even when the disk 275(A) sits on the outer seat 201(A). Similarly, in the disk 275(B) of the rod chamber 18 side, the chamber 262(B) between the outer seat 201(B) and the inner seat 257(B) abutting therewith is in communication with the rod chamber 18 at the notch section 305(B). That is, the notch section 305(B) configures a fixed orifice 325(B) configured to bring the path 263(B), i.e., the bottom chamber 19, in communication with the rod chamber 18 even when the disk 275(B) sits on the outer seat 201(B). In addition, a notch section may be formed in the disk 275 to form a fixed orifice without forming the notch section 305 at the outer seat 201.

During the non-operating state, the disk 275(A) abuts the outer seat 201(A) and the disk support section 260(A) of the piston main body 231 to close the path 263(A).

In addition, even in this state, the rod chamber 18 and the bottom chamber 19 are in communication with each other via the path 263(A) and the fixed orifice 325(A). Then, from the non-operating state, when the piston rod 13 is moved from the cylinder 11 to the extension side at which the protrusion amount is increased, the pressure in the rod chamber 18 is increased to be higher than that of the bottom chamber 19 side by the piston 212 moved with the piston rod 13. As a result, the working fluid flows from the rod chamber 18 toward the bottom chamber 19 via the path 263(A) formed in the piston main body 231.

Figure 12:
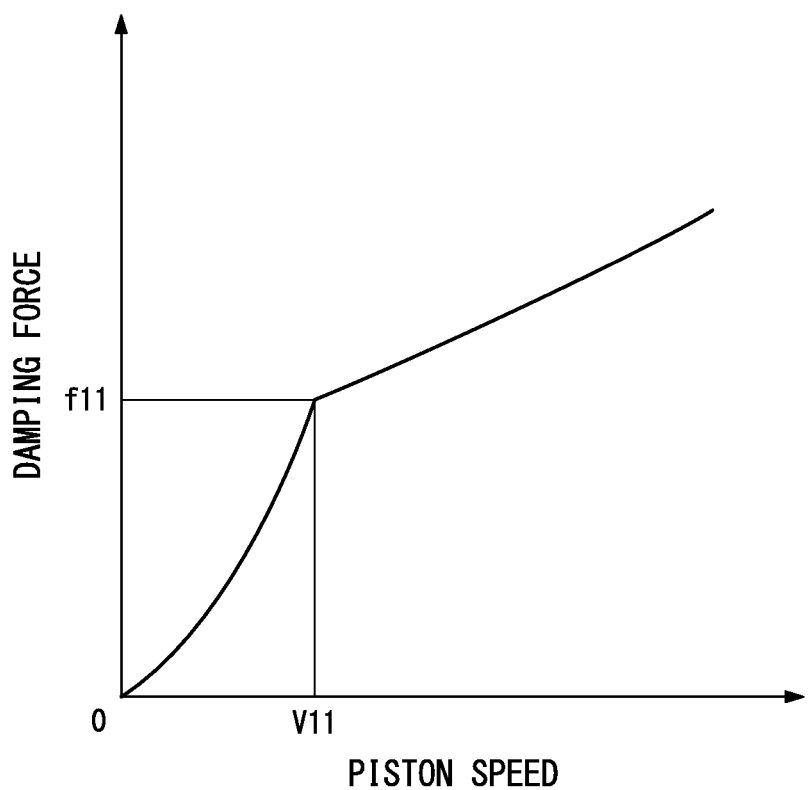
FIG. 12 is a characteristic diagram showing damping force properties of the shock absorber according to the third embodiment of the present invention.

Here, as shown in FIG. 12, when the piston speed, which is a moving speed of the piston 212, is within a predetermined slow range of 0 to V11, the disk 275(A) maintains a state abutting the outer seat 201(A). Then, the working fluid flows from the rod chamber 18 toward the bottom chamber 19 at a constant flow path area of the fixed orifice 325(A) via the path 263(A) and the fixed orifice 325(A). Accordingly, a damping force of 0 to f11 shown in FIG. 12 of orifice properties (a damping force is substantially in proportion to a square of the piston speed) is generated.

In addition, when the piston speed is within a predetermined rapid range of V11 or more, the disk 275(A) is spaced apart from the outer seat 201(A) against an elastic force generated by the elastic deformation thereof. Then, the working fluid flows from the rod chamber 18 toward the bottom chamber 19 at a flow path area increased in response to the valve opening amount between the disk 275(A) and the outer seat 201(A) via the path 263(A). Accordingly, a damping force of f11 or more shown in FIG. 12 of the valve properties in response to the valve opening amount between the outer seat 201(A) and the disk 275(A) is generated.

As described above, in the path 263(A) formed in the piston main body 231, when the piston rod 13 is moved to the extension side and the piston 212 is slid in the cylinder 11 with the piston rod 13, the working fluid flows from the rod chamber 18 toward the bottom chamber 19 by the sliding movement.

The piston main body 231 through which the path 263(A) passes, the outer seat 201(A), the inner seat 257(A) and the disk support section 260(A) protruding toward the bottom chamber 19 of the piston main body 231, and the disk 275(A) of the bottom chamber 19 side placed thereon configure the damping force generating mechanism 200(A) of the extension side installed at a portion of the path 263(A) and configured to suppress a flow of the working fluid to generate the damping force.

In addition, in the non-operating state, the disk 275(B) abuts the outer seat 201(B) and the disk support section 260 (B) of the piston main body 231 to close the path 263(B). Further, even in this state, the rod chamber 18 and the bottom chamber 19 are in communication with each other via the path 263(B) and the fixed orifice 325(B). Then, from the non-operating state, when the piston rod 13 is moved to the compression side at which an advance amount to the cylinder 11 is increased, the pressure in the bottom chamber 19 is increased to be higher than that of the rod chamber 18 side by the piston 212 moved with the piston rod 13. As a result, the working fluid flows from the bottom chamber 19 toward the rod chamber 18 via the path 263(B) formed in the piston main body 231. Here, similarly, when the piston speed is slow, the working fluid flows from the bottom chamber 19 toward the rod chamber 18 at a constant flow path area of the fixed orifice 325(B). In addition, when the piston speed is fast, the disk 275(B) is separated from the outer seat 201(B), and the working fluid flows from the bottom chamber 19 toward the rod chamber 18 at a flow path area increased in response to the valve opening amount between the disk 275(B) and the outer seat 201(B) via the path 263(B).

The piston main body 231 through which the path 263(B) passes, the outer seat 201(B), the inner seat 257(B) and the disk support section 260(B) protruding toward the rod chamber 18 of the piston main body 231 and the disk 275(B) of the rod chamber 18 side placed thereon configure the damping force generating mechanism 200(B) of the extension side installed at a portion of the path 263(B) and configured to suppress a flow of the working fluid to generate the damping force.

According to the shock absorber of the third embodiment, in the disk support section 260, the tip height position in the protruding direction is higher than the same position in the radial direction of the disk 275 while being pressed against the inner seat 257 and placed on the intermediate protrusion section 258, and the tip height position in the protruding direction is higher than the same position in the radial direction of the disk 275 in a state in which the outer protrusion section 259 is pressed against the inner seat 257 and placed on the intermediate protrusion section 258 and the disk support section 260. Accordingly, the disk 275 is elastically deformed such that the first bending section 311 bent in a convex shape toward the piston main body 231 is formed between the inner seat 257 and the disk support section 260 and the second bending section 312 bent in a convex shape toward a side spaced apart from the piston main body 231 is formed between the disk support section 260 and the outer protrusion section 259. Then, the disk 275 is elastically deformed as described above to abut the outer protrusion section 259 at the outer circumferential side of the second bending section 312 by the elastic force. As described above, since the disk 275 is elastically deformed into a shape having the second bending section 312 bent in a convex shape toward a side spaced apart from the piston main body 231 between the disk support section 260 and the outer protrusion section 259 to abut the outer protrusion section 259, a separating direction from the outer protrusion section 259 coincides with a direction in which the second bending section 312 is returned to the flat natural state. Accordingly, the set load can be suppressed to a low level even when the manufacturing deviation (tolerance) is absorbed. Accordingly, since the disk 275 can be easily separated from the outer seat 201 and an increase of the valve opening point can be suppressed, the valve properties can be appropriate.

In addition, since the path hole 243 formed in the piston main body 231 is parallel to the axial direction of the piston main body 231, even when the piston main body 231 is integrally formed through sintering, the path hole 243 can be formed during the sintering. Accordingly, for example, drilling or the like needed when an inclined hole is formed is unnecessary, and the manufacturing cost can be reduced.

In the case of a variant seat, when a step difference is formed between the outer protrusion section and the inner protrusion section to obtain a desired damping force, the disk does not conform to the shape to increase the gap, and the working fluid may be leaked. For this reason, the variant seat is flattened, a protrusion is attached to the disk, or the number of stacked disks is increased. When the structure is provided, the cost is increased and the deviation may occur from the damping force. On the other hand, according to the shock absorber of the third embodiment, even when the outer seat 201 is flattened, the disk 275 has a flat shape and the number of stacked single body disks 304 is suppressed, a desired damping force can be stably obtained. Accordingly, the stable damping force properties can be obtained at a low cost.

In addition, the piston main body 231 of the third embodiment can also be modified as follows.

Figure 13:
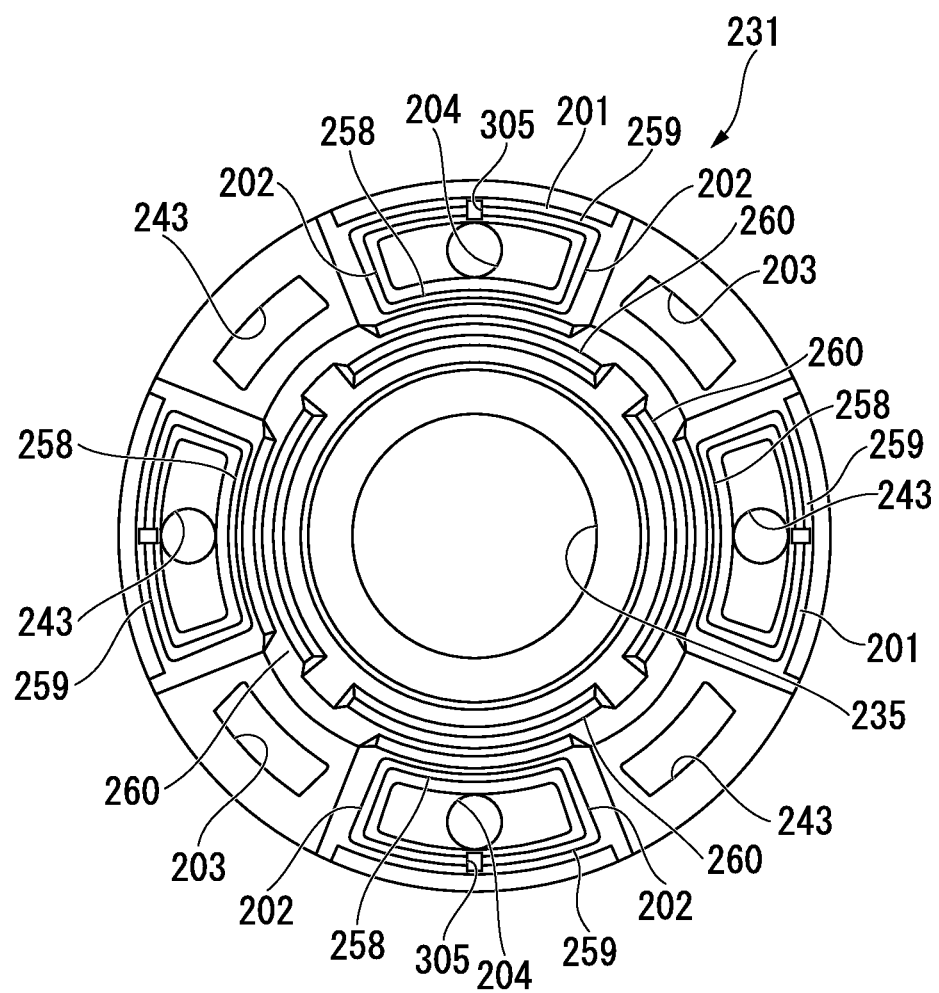
FIG. 13 is a plan view showing a modified example of a piston main body used in the shock absorber according to the third embodiment of the present invention.
Figure 14:
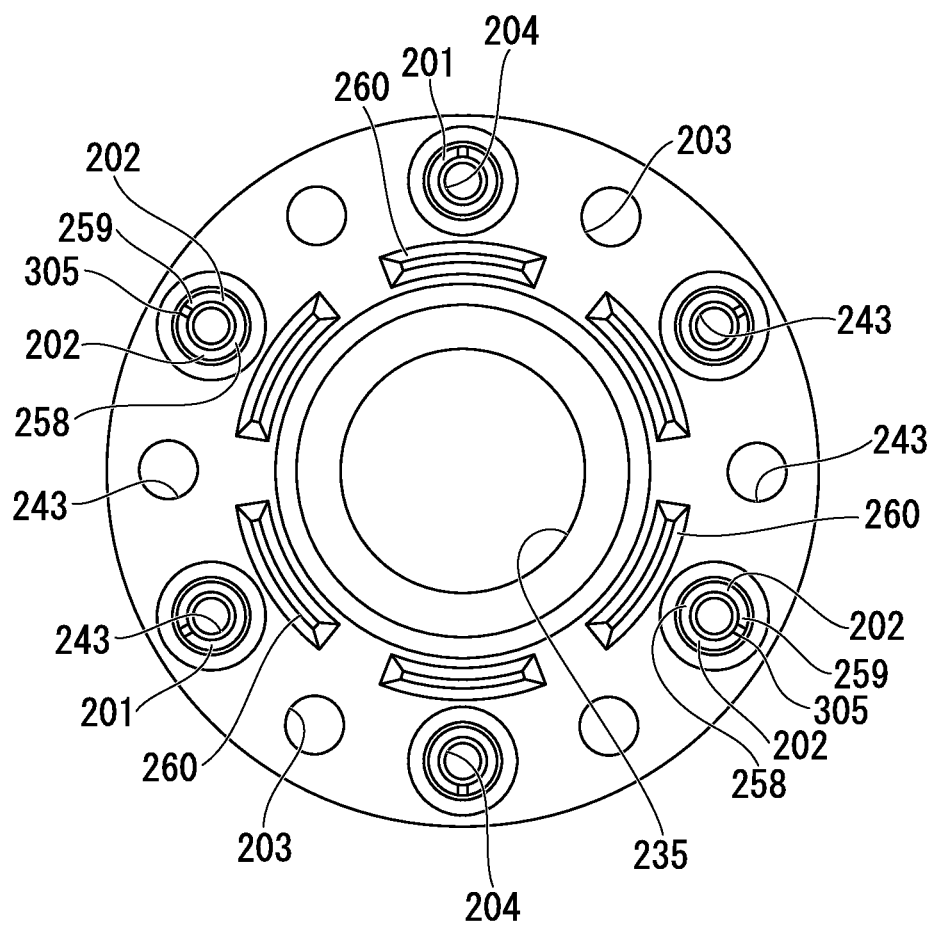
FIG. 14 is a plan view showing another modified example of the piston main body used in the shock absorber according to the third embodiment of the present invention.

As shown an one side in the axial direction is FIG. 13, the position of the intermediate protrusion section 258 in the circumferential direction of the piston main body 231 is matched to the outer protrusion section 259, one ends of the outer protrusion section 259 and the intermediate protrusion section 258 matched to the positions in the circumferential direction are connected by the connecting protrusion section 202, and the other ends are connected by the connecting protrusion section 202. As a result, the outer seat 201 (the other side in the axial direction is also similarly modified) is formed to surround each of the path holes 243. In addition, as a further modification, as shown an one side in the axial direction in FIG. 14, the outer seat 201 is formed such that the outer protrusion section 259, the connecting protrusion sections 202 and 202 and the intermediate protrusion section 258 are connected in a circular shape (the other side in the axial direction is also similarly modified). Even in this case, the height positions of the inner seat 257, the disk support section 260, the intermediate protrusion section 258 and the outer protrusion section 259 are set to satisfy the relation, and the disk 275 is deformed in the same way as above.

In addition, the disk 275 may be configured by stacking a plurality of single body disks having different outer diameters such as large, middle, small, and so on.

While the embodiment shows an example in which the present invention is applied to a single pipe type shock absorber, the present invention can be applied to a dual pipe type shock absorber in which an outer pipe is installed at the outer circumference of the cylinder to form a reservoir chamber therebetween, and may be applied to all shock absorbers. For example, when the present invention is applied to the dual pipe type shock absorber, the present invention can be applied to a damping force generating mechanism of a bottom valve installed between the reservoir chamber and the bottom chamber.

According to the above-mentioned embodiment, the shock absorber includes a cylinder in which a working fluid is sealed, a piston slidably inserted into the cylinder and configured to partition the inside of the cylinder into two chambers, a piston rod connected to the piston and extending to the outside of the cylinder, a plurality of paths through which the working fluid flows due to sliding movement of the piston, and a damping force generating mechanism installed at a portion of the path and configured to suppress a flow of the working fluid to generate a damping force. The damping force generating mechanism includes a valve main body through which the path passes, an annular outer seat protruding to the valve main body, an inner seat protruding into the outer seat of the valve main body, an annular intermediate seat protruding to surround an opening section of the path between the outer seat and the inner seat of the valve main body, a disk support section protruding between the intermediate seat and the inner seat, having a tip height position in a protruding direction higher than that of the inner seat and lower than that of the intermediate seat, and continuously or discontinuously disposed in an annular shape, and a first disk placed to be capable of sitting on the outer seat, the inner seat, the intermediate seat and the disk support section. In a state in which the first disk is pressed against the inner seat and placed on the outer seat, the intermediate seat and the disk support section, in the first disk, a first bending section bent in a convex shape toward the valve main body side is formed between the inner seat and the disk support section, and a second bending section bent in a convex shape toward a side spaced apart from the valve main body is formed between the disk support section and the outer seat. Accordingly, the shock absorber sits on the intermediate seat and the outer seat. Accordingly, since the first disk can suppress the set load at a low level as a separating direction from the outer seat coincides with a direction of returning to the natural state, the first disk can be easily separated from the outer seat and an increase in the valve opening point can be suppressed. Therefore, the valve properties can be optimized.

In addition, the plurality of disk support sections are disposed between the paths neighboring in the circumferential direction of the valve main body. For this reason, an increase in size in the radial direction of the valve main body and an increase in size in the radial direction of the shock absorber can be suppressed.

Further, since a second disk having a diameter smaller than that of the first disk is placed on the first disk, the first disk can abut the intermediate seat even when the first disk is separated from the outer seat. Accordingly, a plurality of stages of valve properties can be obtained.

Furthermore, since a third bending section approaching the valve main body is formed at the first disk outside the second bending section between the intermediate seat and the outer seat, the manufacturing deviation can be absorbed and the set load can be suppressed to a low level.

In addition, the shock absorber includes a cylinder in which a working fluid is sealed, a piston slidably inserted into the cylinder and configured to partition the inside of the cylinder into two chambers, a piston rod connected to the piston and extending to the outside of the cylinder, a plurality of paths through which the working fluid flows due to sliding movement of the piston, and a damping force generating mechanism installed at a portion of the path and configured to suppress a flow of the working fluid to generate a damping force. The damping force generating mechanism includes a valve main body through which the path passes, an annular outer seat protruding to the valve main body, an inner seat protruding into the outer seat of the valve main body, an annular intermediate seat protruding to surround an opening section of the path between the outer seat and the inner seat of the valve main body, a disk support section protruding between the intermediate seat and the inner seat and continuously or discontinuously disposed in an annular shape, and a first disk placed on the outer seat, the inner seat, the intermediate seat and the disk support section. The disk support section has a tip height position in the protruding direction higher than that of the first disk in the same position in the radial direction while being pressed against the inner seat and placed on the intermediate seat, and the outer seat has a tip height position in the protruding direction higher than the first disk in the same position in the radial direction while being pressed against the inner seat and placed on the intermediate seat and the disk support section. Accordingly, in the first disk, since a separating direction from the outer seat coincides with a direction of returning to a flat natural state and thus the set load can be suppressed to a low level, the first disk can be easily separated from the outer seat and an increase of the valve opening point can be suppressed. Accordingly, the valve properties can be optimized.

In addition, the shock absorber includes a cylinder in which a working fluid is sealed, a piston slidably inserted into the cylinder and configured to partition the inside of the cylinder into two chambers, a piston rod connected to the piston and extending to the outside of the cylinder, a plurality of paths through which the working fluid flows due to sliding movement of the piston, and a damping force generating mechanism installed at a portion of the path and configured to suppress a flow of the working fluid to generate a damping force. The damping force generating mechanism includes a valve main body through which the path passes, an outer protrusion section protruding to the valve main body, an inner seat protruding into the outer protrusion section of the valve main body, an intermediate protrusion section configured to protrude between the outer protrusion section and the inner seat of the valve main body, a disk support section protruding between the intermediate protrusion section and the inner seat, having a tip height position in the protruding direction higher than that of the inner seat and lower than that of the intermediate protrusion section, and continuously or discontinuously disposed in an annular shape, and a disk placed to be capable of sitting on the outer protrusion section, the inner seat, the intermediate protrusion section and the disk support section. In a state in which the disk is pressed against the inner seat and placed on the outer protrusion section, the intermediate protrusion section and the disk support section, in the disk, a first bending section bent in a convex shape toward the valve main body side is formed between the inner seat and the disk support section, and a second bending section bent in a convex shape toward a side separated from the valve main body is formed between the disk support section and the outer protrusion section. Accordingly, the shock absorber sits on the intermediate protrusion section and the outer protrusion section. Accordingly, in the disk, since the separation direction from the outer seat coincides with a direction of returning to a flat natural state and thus the set load can be suppressed to a low level, the disk can be easily separated from the outer seat and an increase of the valve opening point can be suppressed. Accordingly, the valve properties can be optimized.

In addition, the outer protrusion section is formed in an annular shape, and the intermediate protrusion section is formed in an annular shape to surround an opening section of the path.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A shock absorber comprising:
a cylinder in which a working fluid is sealed;
a piston slidably inserted into the cylinder and configured to partition the inside of the cylinder into two chambers;
a piston rod connected to the piston and extending to the outside of the cylinder;
a plurality of paths through which the working fluid flows due to sliding movement of the piston; and
a damping force generating mechanism installed at a portion of the path and configured to suppress a flow of the working fluid to generate a damping force,
wherein the damping force generating mechanism comprises:
a valve main body through which the path passes;
an annular outer seat protruding to the valve main body;
an inner seat protruding into the outer seat of the valve main body;
an annular intermediate seat protruding to surround an opening section of the path between the outer seat and the inner seat of the valve main body;
a disk support section protruding between the intermediate seat and the inner seat, having a tip height position in a protruding direction higher than that of the inner seat and lower than that of the intermediate seat, and continuously or discontinuously disposed in an annular shape; and
a first disk placed to be capable of sitting on the outer seat, the inner seat, the intermediate seat and the disk support section, and
wherein, in a state in which the first disk is pressed against the inner seat and placed on the outer seat, the intermediate seat and the disk support section, in the first disk, a first bending section bent in a convex shape toward the valve main body side is formed between the inner seat and the disk support section, a second bending section bent in a convex shape toward a side spaced apart from the valve main body is formed between the disk support section and the outer seat, and the shock absorber sits on the intermediate seat and the outer seat.

2. The shock absorber according to claim 1, wherein the plurality of disk support sections are disposed between the paths neighboring in the circumferential direction of the valve main body.

3. The shock absorber according to claim 1, wherein a second disk having a diameter smaller than that of the first disk is placed on the first disk.

4. The shock absorber according to claim 2, wherein a second disk having a diameter smaller than that of the first disk is placed on the first disk.

5. The shock absorber according to claim 1, wherein a third bending section approaching the valve main body is formed at the first disk outside the second bending section between the intermediate seat and the outer seat.

6. The shock absorber according to claim 2, wherein a third bending section approaching the valve main body is formed at the first disk outside the second bending section between the intermediate seat and the outer seat.

7. The shock absorber according to claim 3, wherein a third bending section approaching the valve main body is formed at the first disk outside the second bending section between the intermediate seat and the outer seat.

8. The shock absorber according to claim 4, wherein a third bending section approaching the valve main body is formed at the first disk outside the second bending section between the intermediate seat and the outer seat.

9. A shock absorber comprising:
a cylinder in which a working fluid is sealed;
a piston slidably inserted into the cylinder and configured to partition the inside of the cylinder into two chambers;
a piston rod connected to the piston and extending to the outside of the cylinder;
a plurality of paths through which the working fluid flows due to sliding movement of the piston; and
a damping force generating mechanism installed at a portion of the path and configured to suppress a flow of the working fluid to generate a damping force,
wherein the damping force generating mechanism comprises:
a valve main body through which the path passes;
an annular outer seat protruding to the valve main body;
an inner seat protruding into the outer seat of the valve main body;
an annular intermediate seat protruding to surround an opening section of the path between the outer seat and the inner seat of the valve main body;
a disk support section protruding between the intermediate seat and the inner seat and continuously or discontinuously disposed in an annular shape; and
a first disk placed on the outer seat, the inner seat, the intermediate seat and the disk support section, and
wherein the disk support section has a tip height position in the protruding direction higher than that of the same position in the radial direction of the first disk while being pressed against the inner seat and placed on the intermediate seat, and
the outer seat has a tip height position in the protruding direction higher than the same position in the radial direction of the first disk while being pressed against the inner seat and placed on the intermediate seat and the disk support section.

10. A shock absorber comprising:
a cylinder in which a working fluid is sealed;
a piston slidably inserted into the cylinder and configured to partition the inside of the cylinder into two chambers;
a piston rod connected to the piston and extending to the outside of the cylinder;
a plurality of paths through which the working fluid flows due to sliding movement of the piston; and a damping force generating mechanism installed at a portion of the path and configured to suppress a flow of the working fluid to generate a damping force, wherein the damping force generating mechanism comprises:

a valve main body through which the path passes;

an outer protrusion section protruding to the valve main body;

an inner seat protruding into the outer protrusion section of the valve main body;

an intermediate protrusion section configured to protrude between the outer protrusion section and the inner seat of the valve main body;

a disk support section protruding between the intermediate protrusion section and the inner seat, having a tip height position in the protruding direction higher than that of the inner seat and lower than that of the intermediate protrusion section, and continuously or discontinuously disposed in an annular shape; and a disk placed to be capable of sitting on the outer protrusion section, the inner seat, the intermediate protrusion section and the disk support section, wherein, in a state in which the disk is pressed against the inner seat and placed on the outer protrusion section, the intermediate protrusion section and the disk support section, in the disk, a first bending section bent in a convex shape toward the valve main body side is formed between the inner seat and the disk support section, a second bending section bent in a convex shape toward a side separated from the valve main body is formed between the disk support section and the outer protrusion section, and the shock absorber sits on the intermediate protrusion section and the outer protrusion section.

11. The shock absorber according to claim 10, wherein the outer protrusion section is formed in an annular shape and the intermediate protrusion section is formed in an annular shape to surround an opening section of the path.

* * * * *